(12) United States Patent
Nagata et al.

(10) Patent No.: US 10,057,961 B2
(45) Date of Patent: Aug. 21, 2018

(54) CONTROL DEVICE, CONTROL METHOD, AND PROGRAM

(71) Applicant: SONY CORPORATION, Tokyo (JP)

(72) Inventors: Masaharu Nagata, Tokyo (JP); Satoshi Suzuki, Kanagawa (JP); Seishi Tomonaga, Kanagawa (JP); Yasuhiro Matsui, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/324,852

(22) PCT Filed: Jun. 17, 2015

(86) PCT No.: PCT/JP2015/067418
§ 371 (c)(1),
(2) Date: Jan. 9, 2017

(87) PCT Pub. No.: WO2016/031359
PCT Pub. Date: Mar. 3, 2016

(65) Prior Publication Data
US 2017/0231062 A1    Aug. 10, 2017

(30) Foreign Application Priority Data

Aug. 29, 2014  (JP) ................... 2014-174678

(51) Int. Cl.
*H04N 5/235* (2006.01)
*H05B 37/02* (2006.01)
*H04N 7/18* (2006.01)

(52) U.S. Cl.
CPC ......... *H05B 37/0227* (2013.01); *H04N 7/183* (2013.01); *H05B 37/0218* (2013.01)

(58) Field of Classification Search
CPC .................. H05B 37/02; H05B 37/0227; H05B 37/0218; H04N 7/183; H04N 5/235; G06T 7/70
See application file for complete search history.

(56) References Cited

U.S. PATENT DOCUMENTS

| 2015/0002639 A1* | 1/2015 | Kwon | H04N 13/0296 348/47 |
| 2015/0085089 A1* | 3/2015 | Shigemura | H04N 13/0404 348/54 |
| 2016/0150226 A1* | 5/2016 | Song | G06T 3/40 348/54 |

FOREIGN PATENT DOCUMENTS

| JP | 2004-266458 | 9/2004 |
| JP | 2006-180271 | 7/2006 |
| JP | 2010-124140 | 6/2010 |
| JP | 2010124140 A * | 6/2010 |
| JP | 2013-046172 | 3/2013 |

(Continued)

*Primary Examiner* — Thai Pham
(74) *Attorney, Agent, or Firm* — Paratus Law Group, PLLC

(57) ABSTRACT

There is provided a control device, a control method, and a program through which it is possible to implement a more suitable imaging environment even under a situation in which auxiliary light is emitted from a plurality of light sources, the control device including: an acquisition unit configured to acquire a light emission state of a first light source; and a control unit configured to control an operation of light emission of a second light source that is different from the first light source according to the acquired light emission state of the first light source.

20 Claims, 13 Drawing Sheets

(56) References Cited

FOREIGN PATENT DOCUMENTS

| JP | 2014-006304 | 1/2014 |
| JP | 2014-035446 | 2/2014 |

\* cited by examiner

CONTROL DEVICE, CONTROL METHOD, AND PROGRAM

CROSS REFERENCE TO PRIOR APPLICATION

The application is a National Stage Patent Application of PCT International Patent Application No. PCT/JP2015/067418 (filed on Jun. 17, 2015) under 35 U.S.C. § 371, which claims priority to Japanese Patent Application No. 2014-174678 (filed on Aug. 29, 2014), which are all hereby incorporated by reference in their entirety.

TECHNICAL FIELD

The present disclosure relates to a control device, a control method, and a program.

BACKGROUND ART

When an image is captured by an imaging device such as a digital still camera and a digital video camera under illumination of low illuminance, in order to implement a more suitable imaging environment, auxiliary light is emitted toward a subject from a light source that is operated in linkage with the imaging device in some cases. In this manner, by emitting auxiliary light toward the subject, the imaging device can recognize the subject in the captured image, for example, even under illumination of low illuminance and can control a focal position according to an autofocus (AF) function and detect the subject according to a facial recognition technology and the like. For example, Patent Literature 1 discloses an example of a configuration in which auxiliary light is emitted toward a subject when an image is captured by an imaging device.

CITATION LIST

Patent Literature

Patent Literature 1 JP 2006-180271A

DISCLOSURE OF INVENTION

Technical Problem

Meanwhile, as in a case in which an imaging device is used as a monitoring camera, a plurality of imaging devices are operated in linkage in some cases. In such a case, auxiliary light is emitted from a plurality of light sources in linkage with the imaging devices, and auxiliary light of a light source that is operated in linkage with another imaging device is emitted toward a subject of a certain imaging device in some cases. Therefore, it is necessary to provide a mechanism through which it is possible to implement a more suitable imaging environment even under an environment in which auxiliary light is emitted from a plurality of light sources.

Accordingly, the present disclosure proposes a control device, a control method, and a program through which it is possible to implement a more suitable imaging environment even under a situation in which auxiliary light is emitted from a plurality of light sources.

Solution to Problem

According to the present disclosure, there is provided a control device including: an acquisition unit configured to acquire a light emission state of a first light source; and a control unit configured to control an operation of light emission of a second light source that is different from the first light source according to the acquired light emission state of the first light source.

According to the present disclosure, there is provided a control method performed by a processor, the control method including: acquiring a light emission state of a first light source; and controlling an operation of light emission of a second light source that is different from the first light source according to the acquired light emission state of the first light source.

According to the present disclosure, there is provided a program causing a computer to execute: acquiring a light emission state of a first light source; and controlling an operation of light emission of a second light source that is different from the first light source according to the acquired light emission state of the first light source.

Advantageous Effects of Invention

According to the present disclosure described above, there are provided a control device, a control method, and a program through which it is possible to implement a more suitable imaging environment even under a situation in which auxiliary light is emitted from a plurality of light sources.

Note that the effects described above are not necessarily limitative. With or in the place of the above effects, there may he achieved any one of the effects described in this specification or other effects that may be grasped from this specification.

MODE(S) FOR CARRYING OUT THE INVENTION

Figure 1:
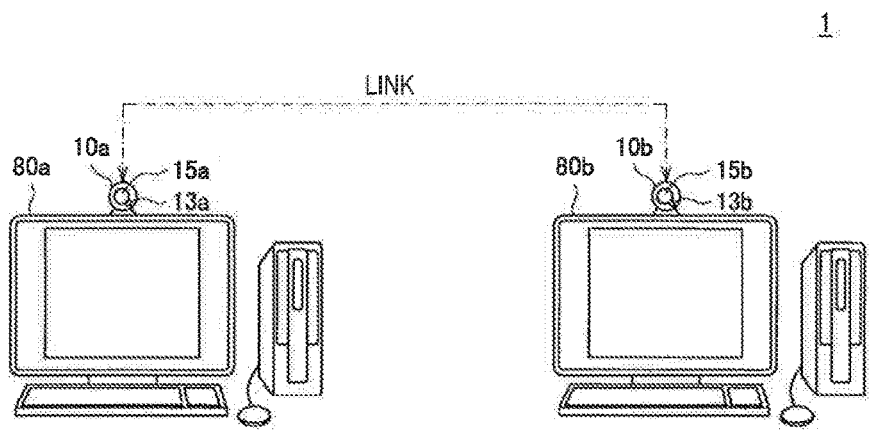
FIG. 1 is an explanatory diagram for describing an example of a schematic system configuration of a control system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will proceed in the following order.
1. First embodiment
   1.1. Overview
   1.2. Functional configuration
   1.3. Processes
   1.4. Modified Examples
      1.4.1. Modified Example 1: Control when three or more imaging devices are operated
      1.4.2. Modified Example 2: Example of system configuration
      1.4.3. Modified Example 3: Example of functional configuration
      1.4.4. Modified Example 4: Example of functional configuration
   1.5. Summary
2. Second embodiment
   2.1. Overview
   2.2. Functional configuration
   2.3. Processes
3. Hardware configuration
4. Summary <1. First Embodiment>
[1.1. Overview]

First, an example of a schematic system configuration of a control system 1 according to a first embodiment of the present disclosure will be described with reference to FIG. 1. FIG. 1 is an explanatory diagram for describing an example of a schematic system configuration of the control system 1 according to the embodiment. The control system 1 according to the embodiment includes a plurality of imaging devices. For example, in the example shown in FIG. 1, the control system 1 includes imaging devices 10a and 10b. Also, in the example shown in FIG. 1.

The imaging device 10a includes an imaging unit 15a and an auxiliary light emitting unit 13a. The imaging unit 15a is a component hr capturing an image of a subject and includes an imaging element such as a complementary metal-oxide semiconductor (CMOS) image sensor and a charge coupled device (CCD) image sensor and an optical system such as a lens.

In addition, the auxiliary light emitting unit 13a is a component for emitting auxiliary light toward a subject and includes a light source configured to emit the auxiliary light. Also, a kind of auxiliary light emitted toward a subject from the auxiliary light emitting unit 13a is not particularly limited. As a specific example, the auxiliary light emitting unit 13a may be configured to emit so-called visible light as auxiliary light. In addition, as another example, the auxiliary light emitting unit 13a may be configured to emit invisible light such as infrared (IR) light as auxiliary light.

Note that, while the example in which the imaging device 10a includes the auxiliary light emitting unit 13a has been described in FIG. 1, the auxiliary light emitting unit 13a may he provided outside the imaging device 10a as long as the auxiliary light emitting unit 13a can be operated based on control of the imaging device 10a. As a specific example, the auxiliary light emitting unit 13a may be configured as a so-called externally attached auxiliary light emitter.

Similarly, the imaging device 10b includes an imaging unit 15b and an auxiliary light emitting unit 13b, Since configurations of the imaging unit 15b and the auxiliary light emitting unit 13b are similar to those of the imaging unit 15a and the auxiliary light emitting unit 13a described above, detailed descriptions thereof will be omitted. In addition, when the imaging devices 10a and 10b are not particularly distinguished, they will be simply referred to as an "imaging device 10" below in some cases. Similarly, when the imaging units 15a and 15b are not particularly distinguished, they will he simply referred to as an "imaging unit 15" in some cases. In addition, when the auxiliary light emitting units 13a and 13b are not particularly distinguished, they will be simply referred to as an "auxiliary light emitting unit 13" in some cases.

Note that, while the example in which the imaging devices 10a and 10b attached to information processing devices 80a and 80b such as a so-called personal computer (PC) are linked to each other is shown in FIG. 1, configurations of the imaging devices 10a and 10b are not necessarily limited thereto. As a specific example, the imaging devices 10a and 10b may be configured as so-called monitoring cameras. In addition, as another example, the imaging devices 10a and 10b may be a component for capturing an image of a region in order for various devices such as a television device to detect a user in a predetermined region.

Figure 2:
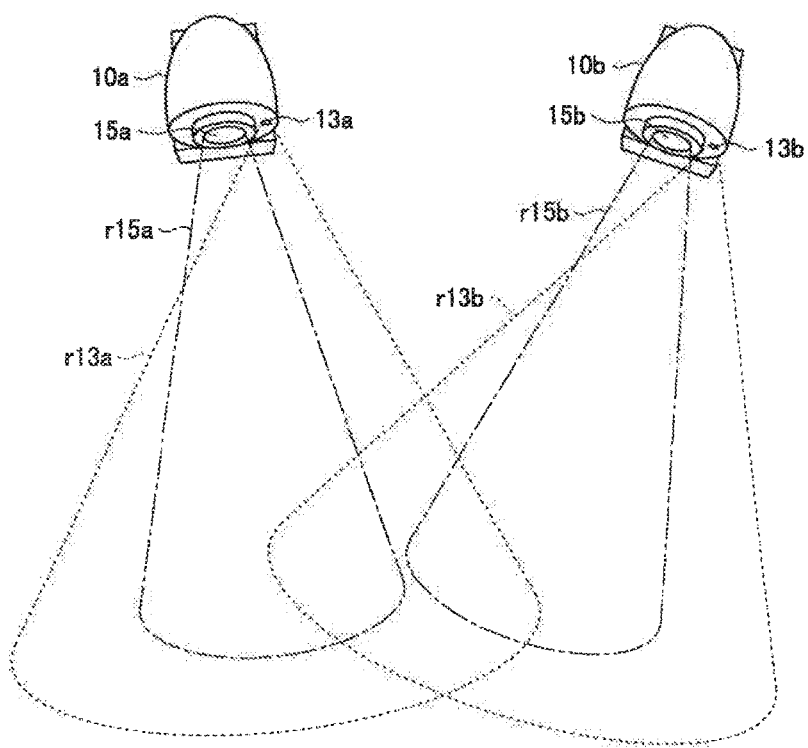
FIG. 2 is an explanatory diagram for describing an overview of the control system according to the embodiment.

Here, in order to more easily understand characteristics of the control system 1 according to the embodiment, first, challenges of the control system 1 according to the embodiment will be summarized with reference to FIG. 2. FIG. 2 is an explanatory diagram for describing an overview of the control system I according to the embodiment and shows an example of an operation environment in which the imaging devices 10a and 10b are operated.

In FIG. 2, a reference sign r15a schematically indicates a region (for example, a region determined based on an angle of view of the imaging unit 15a) that is captured as an image by the imaging unit 15a of the imaging device 10a. Also, the region indicated by the reference sign r15a will be referred to as "imaging region r15a" below in some cases. In addition, a reference sign r13a schematically indicates a region that is illuminated with auxiliary light (that is, auxiliary light emitted from a light source of the auxiliary light emitting unit 13a) emitted from the auxiliary light emitting unit 13a.

Similarly, a reference sign r15b schematically indicates a region (that is, an imaging region) that is captured as art image by the imaging unit 15b of the imaging device 10b. In addition, a reference sign r13b schematically indicates a region that is illuminated with auxiliary light that is emitted from the auxiliary light emitting unit 13b.

In the example shown in FIG. 2, the region r13b illuminated with auxiliary light emitted from the auxiliary light emitting unit 13b overlaps the imaging region r15a of the imaging unit 15a. Therefore, in the example shown in FIG. 2, when the imaging unit 15a captures an image of the imaging region r15a, the imaging region r15a is illuminated with auxiliary light emitted from the auxiliary light emitting unit 13b along with auxiliary light emitted from the auxiliary light emitting unit 13a, That is, in the example shown in FIG. 2, in the imaging region r15a, auxiliary light beams emitted from the auxiliary light emitting units 13a and 13b interfere with each other, and an influence of the interference is manifested on the image captured by the imaging unit 15a in some cases.

As a specific example, a so-called flicker phenomenon is exemplified, That is, auxiliary light beams emitted from the auxiliary light emitting units 13a and 13b interfere with each other, and thus the interference is manifested as a flicker (that is, glimmer or fluctuation) on the image captured by the imaging unit 15a in some cases.

In addition, as another example, it is difficult for the imaging device 10a to properly control imaging conditions (for example, exposure and ISO sensitivity) for the imaging unit 15a to capture an image in some cases. Specifically, the imaging device 10a may control imaging conditions (for example, exposure and ISO sensitivity) for the imaging unit 15a to capture an image according to a light intensity of auxiliary light emitted from the auxiliary light emitting unit 13a. In this case, since the imaging region r15a is also illuminated with the auxiliary light emitted from the auxiliary light emitting unit 13b, the image captured by the imaging unit 15a may become an image having higher luminance (that is, a brighter image) than an image which would have been rightfully captured based on control of the imaging device 10a. Accordingly, for example, at least a part of a region in the image captured by the imaging unit 15a may have saturated luminance, gradation of the region may be deteriorated, and thus a phenomenon of a so-called overexposure may occur.

That is, in view of the above-described object, an object of the control system 1 according to the embodiment is to provide a mechanism through which it is possible to implement a more suitable imaging environment even under a situation in which auxiliary light is emitted from a plurality of auxiliary light emitting units 13 (that is, light sources).

Figure 3:
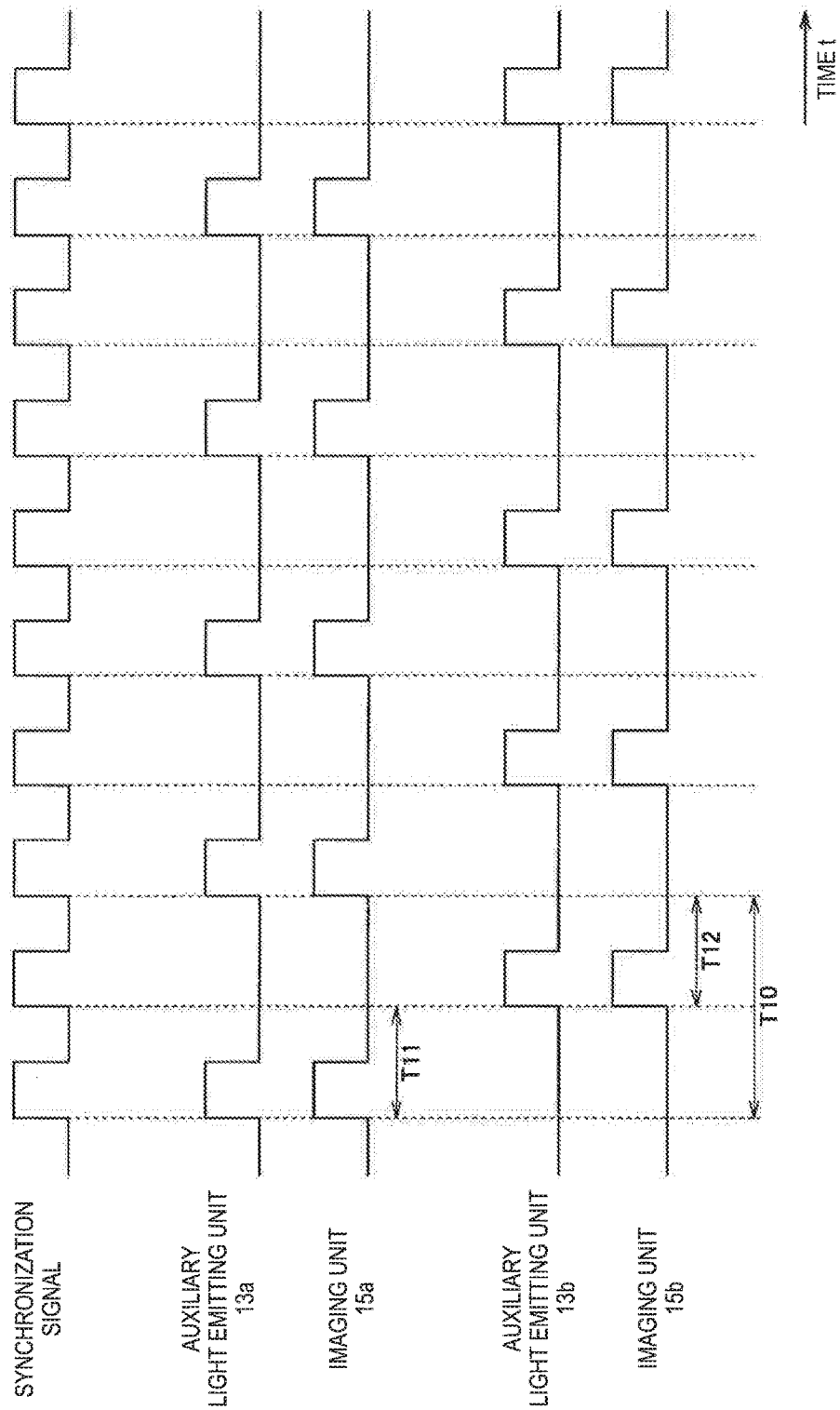
FIG. 3 is an explanatory diagram for describing schematic operations of the control system according to the embodiment.

Specifically, the control system 1 according to the embodiment causes a plurality of auxiliary light emitting units 13 to emit auxiliary light in a time-division manner, and causes the imaging units 15 associated with the auxiliary light emitting units 13 to capture an image in synchronization with a timing at which each of the auxiliary light emitting units 13 emits auxiliary light. For example, FIG. 3 is an explanatory diagram for describing schematic operations of the control system 1 according to the embodiment. FIG. 3 shows an example of a schematic timing chart showing timings at which the auxiliary light emitting units 13a and 13b emit auxiliary light and timings at which the imaging units 15a and 15b capture an image, and a lateral direction corresponds to a time axis.

In the example shown in FIG. 3, timings at which the auxiliary light emitting units 13a and 13b emit auxiliary light (that is, light emission timings) are determined based on a common synchronization signal (for example, a control pulse).

Specifically, in the example shown in FIG. 3, the auxiliary light emitting unit 13a of the imaging device 10a emits auxiliary light in periods indicated by a reference sign T11. In addition, the auxiliary light emitting unit 13b of the imaging device 10b emits auxiliary light in periods (that is, in periods different from the period T11) indicated by a reference sign T12. That is, in a period indicated by a reference sign T10, the auxiliary light emitting units 13a and 13b are controlled such that they emit auxiliary light at different timings (that is, emit auxiliary light in a time-division manner).

In addition, the imaging unit 15a of the imaging device 10a captures an image in synchronization with a light emission timing of the auxiliary light emitting unit 13a. That is, in the example shown in FIG. 3, the imaging unit 15a is controlled such that it captures an image in the period T11. Similarly, the imaging unit 15b of the imaging device 10b captures an image in synchronization with a light emission timing of the auxiliary light emitting unit 13b. That is, in the example shown in FIG. 3, the imaging unit 15b is controlled such that it captures an image in the period T12.

In this case, for example, when a frame rate of the synchronization signal is set to 120 [fps], a frame rate at which each of the auxiliary light emitting units 13 emits auxiliary light and a frame rate at which each of the imaging units 15 captures an image are set to 60 [fps].

According to such control, in the operation environment shown in FIG. 2, in a period during which the auxiliary light emitting unit 13a illuminates the region r13a with auxiliary light, the imaging unit 15a captures an image of the imaging region r15a. During this period, the auxiliary light emitting unit 13b is controlled such that it does not emit auxiliary light. Similarly, in a period during which the auxiliary light emitting unit 13b illuminates the region r13b with auxiliary light, the imaging unit 15b captures an image of the imaging region r15b. During this period, the auxiliary light emitting unit 13a is controlled such that it does not emit auxiliary light.

In such a configuration, the control system 1 according to the embodiment can suppress interference of auxiliary light emitted from the plurality of auxiliary light emitting units 13 and cause each of the imaging units 15 to capture an image on which appropriate exposure control is performed.

The overview of the control system 1 according to the embodiment has been described above with reference to FIG. 1 to FIG. 3. In addition, the control system 1 according to the embodiment will he described in further detail below.

[1.2. Functional Configuration]

Figure 4:
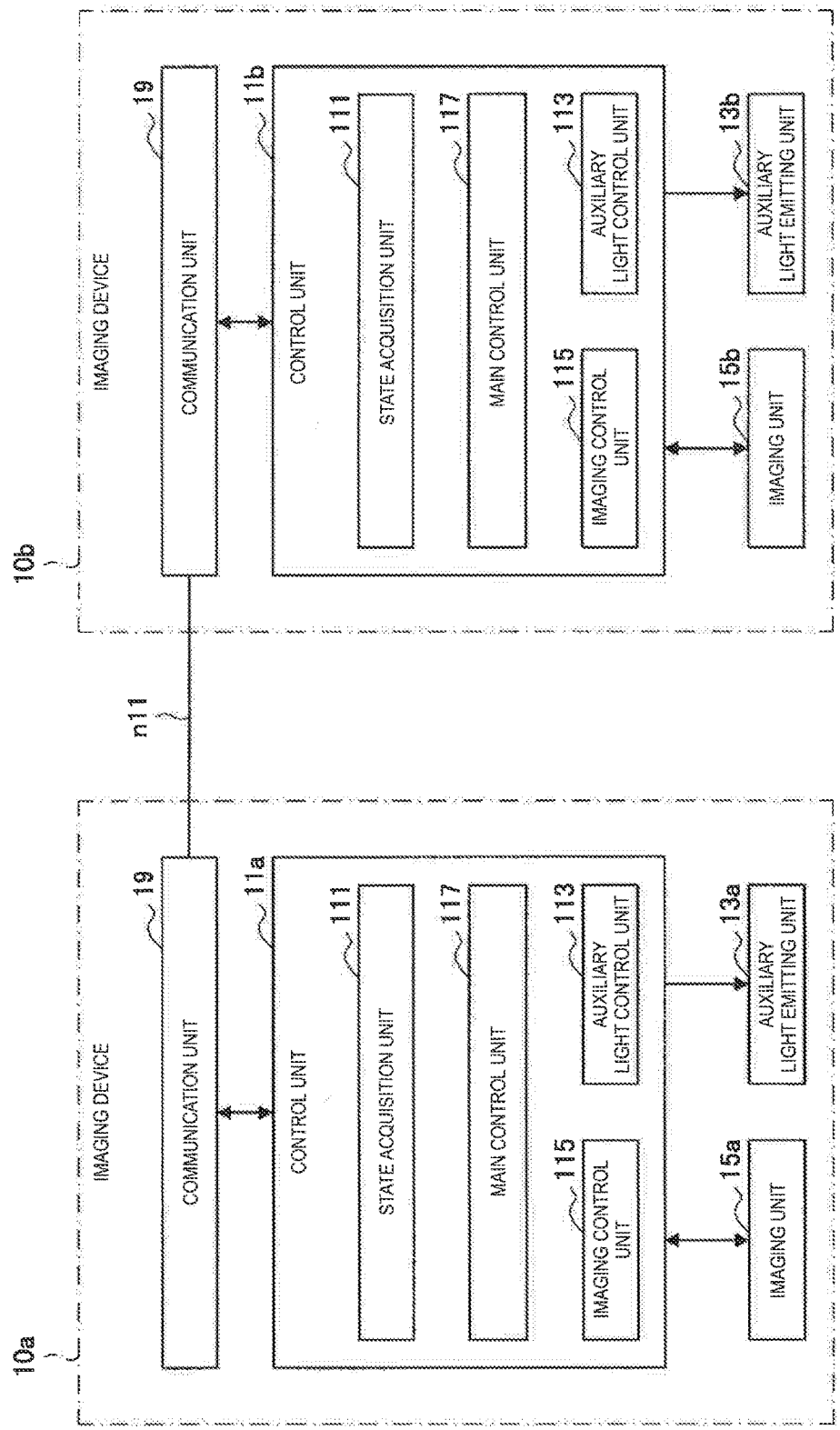
FIG. 4 is a block diagram showing an example of a functional configuration of the control system according to the embodiment.

An example of a functional configuration of the control system 1 according to the embodiment will he described with reference to FIG. 4. FIG. 4 is a block diagram showing an example of a functional configuration of the control system 1 according to the embodiment. Note that description will focus particularly on functional configurations of the imaging devices 10a and 10b.

As shown in FIG. 4, the imaging device 10a according to the embodiment includes a control unit 11a, the auxiliary light emitting unit 13a, the imaging unit 15a, and a communication unit 19. Note that the auxiliary light emitting unit 13a and the imaging unit 15a shown in FIG. 4 correspond to the auxiliary light emitting unit 13a and the imaging unit 15a. shown in FIG. 1 to FIG. 3.

The control unit 11a is a component for controlling operations of the auxiliary light emitting unit 13a and the imaging unit 15a. Note that the control unit 11a will be separately described below in detail.

The communication unit 19 is an interface for components (in particular, the control unit 11a) of the imaging device 10a to transmit and receive information to and from an external device that is connected through a transfer path n11. Also, a form of the transfer path n11 is not particularly limited as long as information can be transmitted and received between the imaging device 10a and the external device (for example, the imaging device 10b).

As a specific example, the transfer path all may be configured as a so-called exclusive line. In this case, the communication unit 19 may correspond to an interface for connection to the transfer path nil configured as an exclusive line. In addition, the components of the imaging device 10a transmit and receive a signal (for example, a synchronization signal indicating a synchronization timing) indicating information serving as a transmission target to and from the external device through the transfer path n11 configured as an exclusive line.

In addition, as another example, the transfer path n11 may be configured as a wired or wireless network. In this ease, the communication unit 19 may correspond to a communication interface for communication with the external device via the network.

In addition, as long as information can be transmitted and received between the imaging device 10a and the external device, a configuration and method for transmitting and receiving the information are not particularly limited. For example, the imaging device 10a may transmit and receive information to and from the external device through so-called optical communication (for example, infrared communication) using light (for example, infrared light and visible light) of a predetermined band as a medium for transmitting and receiving information.

In addition, in the control system 1 shown in FIG. 4, when the components of the imaging device 10a transmit and receive information to and from the external device through the transfer path n11 below, the information is transmitted and received through the communication unit 19 even if this is not specifically described.

Similarly, the imaging device 10b according to the embodiment includes a control unit 11b, the auxiliary light emitting unit 13b, the imaging unit 15b, and the communication unit 19. In addition, the auxiliary light emitting unit 13b and the imaging unit 15b shown in FIG. 4 correspond to the auxiliary light emitting unit 13b and the imaging unit 15b shown in FIG. 1 to FIG. 3.

In addition, the control unit 11b is a component for controlling operations of the auxiliary light emitting unit 13b and the imaging unit 15b. Note that the control unit 11b will be separately described below in detail similarly to the control unit 11a. In addition, when the control units 11a and 11b are not particularly distinguished, they will be simply referred to as a "control unit 11" below in some cases.

In addition, since a configuration of the communication unit 19 in the imaging device 10b is similar to that of the imaging device 10a, detailed description thereof will he omitted. Also, in the control system 1 shown in FIG. 4, when components of the imaging device 10b transmit and receive information to and from an external device through the transfer path nil below, the information is transmitted and received through the communication unit 19 even if this is not specifically described.

In addition, as described above, the auxiliary light emitting unit 13 may be provided outside the imaging device 10. Similarly, the imaging unit 15 may be provided outside the imaging device 10. In addition, some components of the imaging unit 15 may be provided outside the imaging device 10. As a specific example, a configuration in which an imaging element such as an image sensor of the imaging unit 15 is provided in the imaging device 10 and an optical system such as a lens is externally attached to the outside of the imaging device 10 may be used and thus the imaging device 10 may be configured as a so-called interchangeable lens type imaging device.

In addition, in the control system 1 according to the embodiment, among the plurality of imaging devices 10 (for example, the imaging devices 10a and 10b), any imaging device 10 is operated as a master and the other imaging devices 10 other than the master are operated as slaves. Therefore, between the imaging devices 10a and 10b shown in FIG. 4, the imaging device 10a will be operated as a master and the imaging device 10b will be operated as a slave below, and details of configurations of the imaging devices 10 will be described with a focus particularly on a configuration of the control unit 11.

(Master)

First, details of a configuration of the imaging device 10a operated as a master will be described with a focus particularly on a configuration of the control unit 11a. As shown in FIG. 4, the control unit 11a according to the embodiment includes a state acquisition unit 111, an auxiliary light control unit 113, an imaging control unit 115, and a main control unit 117.

The state acquisition unit 111 of the imaging device 10a acquires control parameters for the auxiliary light emitting unit 13a to emit auxiliary light from a predetermined acquisition source. Note that the control parameters include setting information of, for example, a light emission interval (for example, a frame rate) of auxiliary light that is emitted from the auxiliary light emitting unit 13a, a range within which the light emission interval is controllable, a light intensity of auxiliary light, a range within which the light intensity is controllable, and a frequency of light that is emitted as auxiliary light. In the control system 1 according to the embodiment, the state acquisition unit 111 acquires at least a control parameter indicating a light emission interval (or a range within which the light emission interval is controllable) of auxiliary light that is emitted from the auxiliary light emitting unit 13a.

Also, control parameters (in other words, settings) for the auxiliary light emitting unit 13a to emit auxiliary light directly or indirectly indicate a state (hereinafter simply referred to as a "light emission state" in sonic case) when the auxiliary light emitting unit 13a emits light. Note that, hereinafter, states described as a light emission state of the auxiliary light emitting unit 13a include a state in which the auxiliary light emitting unit 13a actually emits auxiliary light and settings in which the auxiliary light emitting unit 13a emits auxiliary light. That is, the state acquisition unit 111 according to the embodiment acquires a light emission state of the auxiliary light emitting unit 13a based on the control parameters. This is similar to the auxiliary light emitting unit 13b.

In addition, as long as the state acquisition unit 111 of the imaging device 10a can acquire control parameters for the auxiliary light emitting unit 13a to emit auxiliary light, an acquisition source of the control parameters is not particularly limited. As a specific example, the control parameters may be stored in advance in a storage region (for example, a storage region provided within the imaging device 10a) which is readable by the state acquisition unit 111. In addition, as another example, the state acquisition unit 111 may acquire the control parameters as a user input. In this case, a manipulation interface for a user to set control parameters may be provided in the imaging device 10a. In addition, as still another example, the state acquisition unit 111 may acquire the control parameters from an external device connected via a network.

In addition, the state acquisition unit 111 of the imaging device 10a acquires control parameters for the auxiliary light emitting unit 13b to emit auxiliary light from the imaging device 10b through the transfer path n11. In this case, the state acquisition unit 111 instructs the imaging device 10b to transmit control parameters and thus may actively acquire the control parameters from the imaging device 10b. Also, as another example, the state acquisition unit 111 may await transmission of control parameters from the imaging device 10b and thus may passively acquire the control parameters from the imaging device 10b.

Note that, in this case, the state acquisition unit 111 of the imaging device 10a confirms an operation state of the imaging device 10b serving as a link target based on communication through the transfer path n11, and only when the imaging device 10b is operated, may acquire control parameters from the imaging device 10b.

In addition, control parameters for the auxiliary light emitting unit 13b to emit auxiliary light directly or indirectly indicate a "light emission state" of the auxiliary light emitting unit 13b. That is, the state acquisition unit 111 according to the embodiment acquires a light emission state of the auxiliary light emitting unit 13b based on the control parameters.

As described above, the state acquisition unit 111 of the imaging device 10a acquires light emission states of the auxiliary light emitting units 13a and 13b (for example, light emission intervals of the auxiliary light emitting units 13a and 13b), and outputs the acquired light emission states of the auxiliary light emitting units 13a and 13b to the main control unit 117.

The main control unit 117 of the imaging device 10a acquires light emission states of the auxiliary light emitting units 13a and 13b (for example, light emission intervals of the auxiliary light emitting units 13a and 13b) from the state acquisition unit 111. Then, the main control unit 117 generates a synchronization signal for connecting timings at which the auxiliary light emitting units 13a and 13b emit auxiliary light based on the acquired light emission states of the auxiliary light emitting units 13a and 13b. For example, FIG. 3 shows an example of the synchronization signal that is generated by the main control unit 117.

When the synchronization signal is generated, the main control unit 117 sets light emission timings of the auxiliary light emitting units 13a and 13b such that the auxiliary light emitting units 13a and 13b emit auxiliary light at different timings (that is, auxiliary light beams are emitted in a time-division manner).

Specifically, in the example shown in FIG. 3, the main control unit 117 divides the period T10 into the period T11 and the period T12, and allocates a light emission timing of the auxiliary light emitting unit 13a to the period T11 (for example, in odd frames). In addition, the main control unit 117 allocates a light emission timing of the auxiliary light emitting unit 13b to the period T12 (for example, in even frames).

In addition, the main control unit 117 of the imaging device 10a may also set timings at which the imaging units 15a and 15b capture an image. In this case, the main control unit 117 sets the imaging timing of the imaging unit 15a (for example, allocates it to the period T11) such that the imaging unit 15a captures an image in synchronization with a light emission timing of the auxiliary light emitting unit 13a. Similarly; the main control unit 117 sets the imaging timing of the imaging unit 15b (for example, allocates it to the period T12) such that the imaging unit 15b captures an image in synchronization with a light emission timing of the auxiliary light emitting unit 13b.

Then, the main control unit 117 of the imaging device 10a supplies a control signal (for example, a control pulse) to the auxiliary light control unit 113 according to the set light emission timing of the auxiliary light emitting unit 13a. The auxiliary light control unit 113 controls an operation of the auxiliary light emitting unit 13a emitting auxiliary light based on the control signal supplied from the main control unit 117.

Also, the auxiliary light control unit 113 of the imaging device 10a is a component for controlling an operation of the auxiliary light emitting unit 13a emitting auxiliary light (for example, controlling at least any of a light emission timing of auxiliary light, a light emission time, and an amount of light emission). In particular, the auxiliary light control unit 113 according to the embodiment controls a light emission timing of the auxiliary light emitting unit 13a in synchronization with the control signal supplied from the main control unit 117. In this case, the auxiliary light control unit 113 may control a light emission time of the auxiliary light emitting unit 13a based on the supplied control signal.

In addition, the main control unit 117 of the imaging device 10a. supplies a control signal (for example, a control pulse) to the imaging control unit 115 according to the set imaging timing of the imaging unit 15a. The imaging control unit 115 controls an operation of the imaging unit 15a capturing an image based on the control signal supplied from the main control unit 117.

Also, the imaging control unit 115 of the imaging device 10a is a component for controlling an operation of the imaging unit 15a capturing an image (controlling, for example, an imaging timing, an imaging time, and exposure conditions). In particular, the imaging control unit 115 according to the embodiment controls the imaging timing of the imaging unit 15a in synchronization with the control signal supplied from the main control unit 117. In this case, the imaging control unit 115 may control the imaging time of the imaging unit 15a based on the supplied control signal.

As described above, when operations of the auxiliary light emitting unit 13a and the imaging unit 15a are controlled based on the control signal from the main control unit 117, a light emission timing of the auxiliary light emitting unit 13a and an imaging timing of the imaging unit 15a are synchronized.

In addition, the main control unit 117 of the imaging device 10a notifies the imaging device 10b of control information indicating the set light emission timing of the auxiliary light emitting unit 13b and the set imaging timing of the imaging unit 15b through the transfer path n11. Accordingly, the imaging device 10b can control a light emission timing of the auxiliary light emitting unit 13b and an imaging timing of the imaging unit 15b based on the control information.

Note that, as long as the imaging device 10b can recognize a light emission timing of the auxiliary light emitting unit 13b and an imaging timing of the imaging unit 15b, a kind and content of control information of which the main control unit 117 notifies the imaging device 10b are not particularly limited. For example, the main control unit 117 may transmit a control signal (for example, a control pulse) indicating a light emission timing of the auxiliary light emitting unit 13b and an imaging timing of the imaging unit 15b to the imaging device 10b through the transfer path n11.

Details of the configuration of the imaging device 10a operated as a master have been described above with a focus particularly on the configuration of the control unit 11a.

(Slave)

Next, details of a configuration of the imaging device 10b operated as a slave will be described with a focus particularly on a configuration of the control unit 11b. As shown in FIG. 4, the control unit 11b according to the embodiment includes the state acquisition unit 111, the auxiliary light control unit 113, the imaging control unit 115, and the main control unit 117.

The state acquisition unit 111 of the imaging device 10b acquires control parameters for the auxiliary light emitting unit 13b to emit auxiliary light from a predetermined acquisition source. In addition, since details of control parameters and an acquisition source of the control parameters are similar to those of the imaging device 10a described above, details thereof will not be described. In addition, in the control system 1 according to the embodiment, the state acquisition unit 111 acquires at least a control parameter indicating a light emission interval (or a range within which the light emission interval is controllable) of auxiliary light that is emitted from the auxiliary light emitting unit 13b.

The state acquisition unit 111 of the imaging device 10b transmits the acquired control parameters to the imaging device 10a through the transfer path n11, Also, in this case, the state acquisition unit 111 may passively transmit the control parameters to the imaging device 10a based on an instruction from the imaging device 10a. In addition, as another example, the state acquisition unit 111 may actively transmit (for example, push transmit) the control parameters to the imaging device 10a at a timing (for example, a timing at which control parameters are acquired or a timing at which the imaging device 10b starts) that is determined in advance.

The main control unit 117 of the imaging device 10b acquires control information indicating a light emission timing of the auxiliary light emitting unit 13b and an imaging timing of the imaging unit 15b from the imaging device 10b response to transmission of control parameters from the state acquisition unit 111 to the imaging device 10a.

The main control unit 117 of the imaging device 10b recognizes a light emission timing of the auxiliary light emitting unit 13b based on the acquired control information and supplies a control signal (for example, a control pulse) to the auxiliary light control unit 113 according to the light emission timing. The auxiliary light control unit 113 controls an operation of the auxiliary light emitting unit 13b emitting auxiliary light based on the control signal supplied from the main control unit 117.

Note that the auxiliary light control unit 113 of the imaging device 10b corresponds to the auxiliary light control unit 113 in the imaging device 10a and is a component for controlling an operation of the auxiliary light emitting unit 13b emitting auxiliary light. In particular, the auxiliary light control unit 113 according to the embodiment controls a light emission timing of the auxiliary light emitting unit 13b in synchronization with the control signal supplied from the main control unit 117. In this case, the auxiliary light control unit 113 may control a light emission time of the auxiliary light emitting unit 13b based on the supplied control signal.

In addition, the main control unit 117 of the imaging device 10b recognizes an imaging timing of the imaging unit 15b based on the acquired control information and supplies a control signal (for example, a control pulse) to the imaging control unit 115 according to the imaging timing. The imaging control unit 115 controls an operation of the imaging unit 15b capturing an image based on the control signal supplied from the main control unit 117.

Also, the imaging control unit 115 of the imaging device 10b corresponds to the imaging control unit 115 in the imaging device 10a and is a component for controlling an operation of the imaging unit 15b capturing an image. In particular, the imaging control unit 115 according to the embodiment controls an imaging timing of the imaging unit 15b in synchronization with the control signal supplied from the main control unit 117. In this case, the imaging control unit 115 may control an imaging time of the imaging unit 15b based on the supplied control signal.

As described above, when operations of the auxiliary light emitting unit 13b and the imaging unit 15b are controlled based on the control signal from the main control unit 117, a light emission timing of the auxiliary light emitting unit 13b and an imaging timing of the imaging unit 15b are synchronized. In addition, in this case, the auxiliary light emitting units 13a and 13b are controlled such that they emit auxiliary light at different timings (that is, auxiliary light beams are emitted in a time-division manner).

As described above, the control system 1 according to the embodiment performs control such that the auxiliary light emitting units 13a and 13b emit auxiliary light at different timings (that is, auxiliary light beams are emitted in a time-division manner). In such a configuration, the control system 1 according to the embodiment can prevent occurrence of a situation in which auxiliary light beams emitted from the auxiliary light emitting units 13a and 13b interfere with each other and prevent an influence of the interference from being manifested. That is, according to the control system 1 of the embodiment, it is possible to implement a more suitable imaging environment even under a situation in which auxiliary light is emitted from the plurality of auxiliary light emitting units 13 (that is, light sources).

Note that the example in which the main control unit 117 sets a light emission timing of the auxiliary light emitting unit 13 and an imaging timing of the imaging unit 15 has been described above. However, as long as a light emission timing of the auxiliary light emitting unit 13 and an imaging timing of the imaging unit 15 are synchronized, a main component for controlling an imaging timing of the imaging unit 15 is not necessarily limited to the main control unit 117. For example, the auxiliary light control unit 113 may be synchronized with a light emission timing of the auxiliary light emitting unit 13 and thus may cause the imaging control unit 115 to control an operation of the imaging unit 15. In addition, as another example, the imaging control unit 115 may recognize an imaging timing of the imaging unit 15 based on a control signal indicating a light emission timing of the auxiliary light emitting unit 13.

In addition, as still another example, the imaging device 10a operated as a master may set a timing at which the auxiliary light emitting unit 13 of each of the imaging devices 10 emits auxiliary light based on a synchronization signal supplied from another external device that is different from each of the imaging devices 10. In this case, the imaging device 10a may recognize a light emission timing of the auxiliary light emitting unit 13b of the imaging device 10b operated as a slave as a "light emission state" of the auxiliary light emitting unit 13b based on the supplied synchronization signal. In addition, as yet another example, the imaging device 10a may recognize a timing that is different from a light emission timing of the auxiliary light emitting unit 13a whose operation is controlled by the imaging device 10a itself within the supplied synchronization signal as a light emission timing of the auxiliary light emitting unit 13b of the imaging device 10b operated as a slave.

Also, as long as the state acquisition unit 111 of the imaging device 10 operated as a master can directly or indirectly acquire a light emission state of the auxiliary light emitting unit 13 of each of the imaging devices 10, details of control parameters that are transmitted and received between the imaging devices 10 are not particularly limited. As a specific example, a configuration in which identification information for specifying a light emission state of the auxiliary light emitting unit 13 is transmitted and received between the imaging devices 10 as control parameters may be used.

In this case, for example, data in which specific information (for example, a light emission interval of auxiliary light) indicating a light emission state of the auxiliary light emitting unit 13 of each of the imaging devices 10 and identification information of the imaging device 10 are associated may be stored in a position which is readable by the state acquisition unit 111 of the imaging device 10 operated as a master. Then, the state acquisition unit 111 acquires identification information from each of the imaging devices 10 as control parameters, checks the acquired identification information and the data, and thus may acquire a light emission state of the auxiliary light emitting unit 13 of the imaging device 10.

In addition, the imaging device 10a operated as a master notifies the imaging device 10b operated as a slave of control information indicating a light emission timing of the auxiliary light emitting unit 13 and also may instruct the imaging device 10b to change control parameters of the auxiliary light emitting unit 13. As a specific example, when a light emission interval of the auxiliary light emitting unit 13a that is controlled by the imaging device 10a itself and a light emission interval of the auxiliary light emitting unit 13b that is controlled by the imaging device 10b are different, the imaging device 10a may instruct the imaging device 10b to change the light emission interval of the auxiliary light emitting unit 13b.

In addition, while the example in which, among the plurality of imaging devices 10, any of the imaging devices 10 is operated as a master and another imaging device 10 other than the master is operated as a slave has been described above, the control system 1 may have a configuration in which the plurality of imaging devices 10 are individually independently operated. ht this case, for example, the plurality of imaging devices 10 may share light emission states of the auxiliary light emitting units 13 and control an operation (for example, a light emission timing and a light emission time) of their own auxiliary light emitting units 13 according to a light emission state (for example, a light emission timing and a light emission time) of the auxiliary light emitting unit 13 of a partner.

[1.3. Processes]

Figure 5:
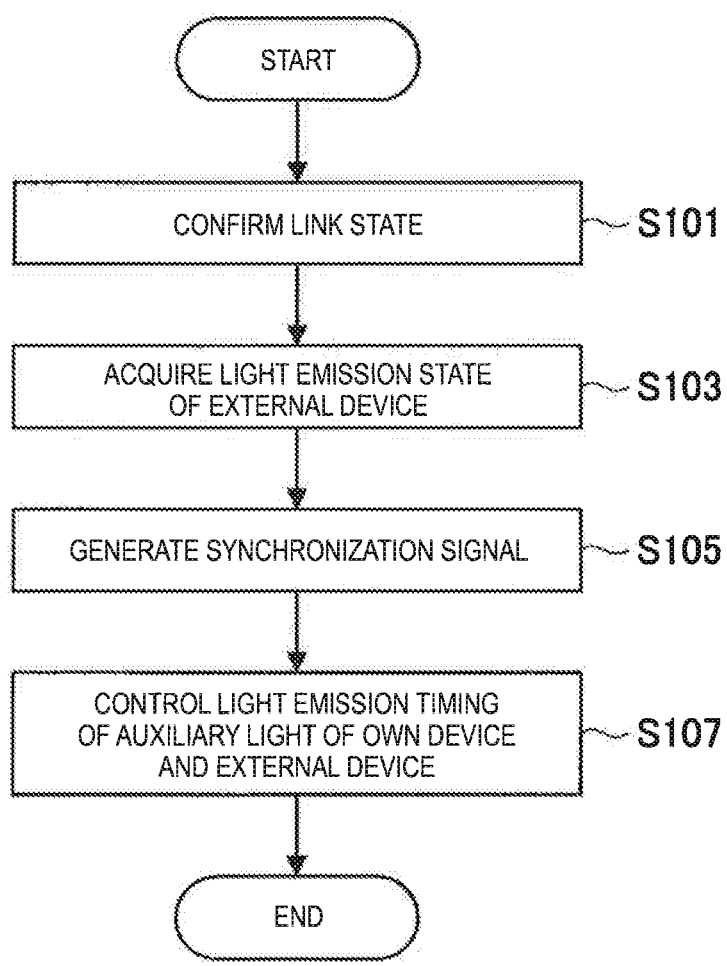
FIG. 5 is a flowchart showing an example of a flow of a series of processes of the control system according to the embodiment.

Next, an example of a flow of a series of processes of the control system 1 according to the embodiment will be described with reference to FIG. 5 with a focus particularly on operations of the imaging device 10a operated as a master. FIG. 5 is a flowchart showing an example of a flow of a series of processes of the control system 1 according to the embodiment.

(Step S101)

First, the state acquisition unit 111 of the imaging device 10a confirms an operation state of the imaging device 10b serving as a link target based on communication through the transfer path n11.

(Step S103)

When the imaging device 10b serving as a link target is operated, the state acquisition unit 111 of the imaging device 10a acquires control parameters for the auxiliary light emitting unit 13b to emit auxiliary light from the imaging device 10b through the transfer path n11.

In addition, in the control system 1 according to the embodiment, the state acquisition unit 111 acquires at least a control parameter indicating a light emission interval (or a range within which the light emission interval is controllable) of auxiliary light that is emitted from the auxiliary light emitting unit 13b from the imaging device 10b.

In addition, in this case, the state acquisition unit 111 instructs the imaging device 10b to transmit control parameters and thus may actively acquire the control parameters from the imaging device 10b. Also, as another example, the state acquisition unit 111 may await transmission of control parameters from the imaging device 10b and thus may passively acquire the control parameters from the imaging device 10b.

Note that control parameters for the auxiliary light emitting unit 13b to emit auxiliary light directly or indirectly indicate a light emission state of the auxiliary light emitting unit 13b. That is, the state acquisition unit 111 according to the embodiment acquires a light emission state of the auxiliary light emitting unit 13b based on the control parameters.

In addition, the state acquisition unit 111 of the imaging device 10a acquires control parameters for the auxiliary light emitting unit 13a to emit auxiliary light from a predetermined acquisition source.

Note that, as long as the state acquisition unit 111 of the imaging device 10a can acquire control parameters for the auxiliary light emitting unit 13a to emit auxiliary light, an acquisition source of the control parameters is not particularly limited. As a specific example, the control parameters may be stored in advance in a storage region (for example, a storage region provided within the imaging device 10a) which is readable by the state acquisition unit 111.

Note that control parameters for the auxiliary light emitting unit 13a to emit auxiliary light directly or indirectly indicate a light emission state of the auxiliary light emitting unit 13a. That is, the state acquisition unit 111 according to the embodiment acquires a light emission state of the auxiliary light emitting unit 13a based on the control parameters.

As described above, the state acquisition unit 111 of the imaging device 10a acquires light emission states of the auxiliary light emitting units 13a and 13b (for example, light emission intervals of the auxiliary light emitting units 13a and 13b), and outputs the acquired light emission states of the auxiliary light emitting units 13a and 13b to the main control unit 117.

(Step S105)

The main control unit 117 acquires light emission states of the auxiliary light emitting units 13a and 13b (for example, light emission intervals of the auxiliary light emitting units 13a and 13b) from the state acquisition unit 111. Then, the main control unit 117 generates a synchronization signal for connecting timings at which the auxiliary light emitting units 13a and 13b emit auxiliary light based on the acquired light emission states of the auxiliary light emitting units 13a and 13b.

When the synchronization signal is generated, the main control unit 117 sets light emission timings of the auxiliary light emitting units 13a and 13b such that the auxiliary light emitting units 13a and 13b emit auxiliary light at different timings (that is, auxiliary light beams are emitted in a time-division manner).

In addition, the main control unit 117 may also set timings at which the imaging units 15a and 15b capture an image. In this case, the main control unit 117 sets the imaging timing of the imaging unit 15a such that the imaging unit 15a captures an image in synchronization with a light emission timing of the auxiliary light emitting unit 13a. Similarly, the main control unit 117 sets the imaging timing of the imaging unit 15b such that the imaging unit 15b captures an image in synchronization with a light emission timing of the auxiliary light emitting unit 13b.

(Step S107)

Then, the main control unit 117 of the imaging device 10a supplies a control signal (for example, a control pulse) to the auxiliary light control unit 113 according to the set light emission timing of the auxiliary light emitting unit 13a. The auxiliary light control unit 113 controls an operation of the auxiliary light emitting unit 13a emitting auxiliary light based on the control signal supplied from the main control unit 117.

In addition the main control unit 117 of the imaging device 10a supplies a control signal (for example, a control pulse) to the imaging control unit 115 according to the set imaging timing of the imaging unit 15a. The imaging control unit 115 controls an operation of the imaging unit 15a capturing an image based on the control signal supplied from the main control unit 117.

As described above, when operations of the auxiliary light emitting unit 13a and the imaging unit 15a are controlled based on the control signal from the main control unit 117, a light emission timing of the auxiliary light emitting unit 13a and an imaging timing of the imaging unit 15a are synchronized.

In addition, the main control unit 117 of the imaging device 10a notifies the imaging device 10b of control information indicating the set light emission timing of the auxiliary light emitting unit 136 and the set imaging timing of the imaging unit 15b through the transfer path n11. Accordingly, the imaging device 10b can control a light emission timing of the auxiliary light emitting unit 13b and an imaging timing of the imaging unit 15b based on the control information.

The example of a flow of a series of processes of the control system 1 according to the embodiment has been described above with reference to FIG. 5 with a focus particularly on operations of the imaging device 10a operated as a master.

[1.4. Modified Examples]

Next, modified examples of the control system 1 according to the embodiment will be described.

<<1.4.1. Modified Example 1: Control When Three or more Imaging Devices are Operated>>

Figure 6:
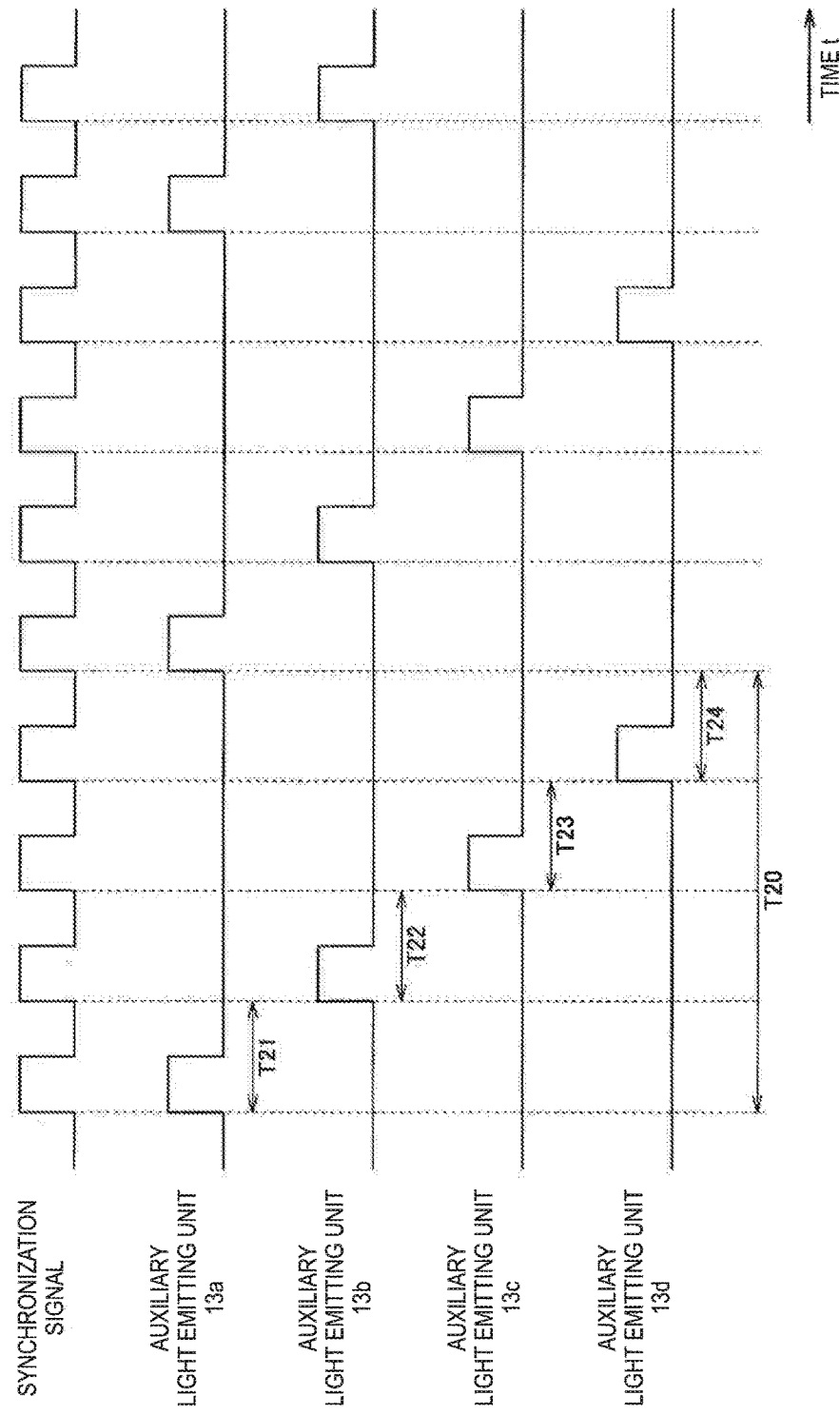
FIG. 6 is an explanatory diagram for describing an overview of a control system according to Modified Example 1.

First, as Modified Example 1, an example of control when three or more imaging devices 10 are operated will be described with reference to FIG. 6. FIG. 6 is an explanatory diagram for describing an overview of the control system 1 according to Modified Example 1. Specifically, FIG. 6 shows an example of a schematic timing chart of timings at which the auxiliary light emitting units 13a to 13d of the imaging devices 10a to 10d emit auxiliary light when the different imaging devices 10a to 10d are operated.

In the example shown in FIG. 6, a period indicated by a reference sign T20 is divided into a plurality of different periods T21 to T24, and different light emission timings of the auxiliary light emitting units 13 are allocated to the periods T21 to T24.

Specifically, in the period T21, the auxiliary light emitting unit 13a of the imaging device 10a emits auxiliary light and the imaging unit 15a of the imaging device 10a captures an image in synchronization with a timing at which the auxiliary light is emitted (that is, a light emission timing of the auxiliary light emitting unit 13a). In this case, the auxiliary light emitting units 13b to 13d of the imaging devices 10b to 10d are controlled such that they do not emit auxiliary light.

In addition, in the period T22, the auxiliary light emitting unit 13b of the imaging device 10b emits auxiliary light and the imaging unit 15b of the imaging device 10b captures an image in synchronization with a timing at which the auxiliary light is emitted (that is, a light emission timing of the auxiliary light emitting unit 13b). Note that, in this case, the auxiliary light emitting units 13a, 13c, and 13d of the imaging devices 10a, 10c, and 10d are controlled such that they do not emit auxiliary light.

Similarly, operations of the auxiliary light emitting units 13 are controlled such that only the auxiliary light emitting unit 13c of the imaging device 10c emits auxiliary light in the period T23 and only the auxiliary light emitting unit 13d of the imaging device 10d emits auxiliary light in the period T24.

In this case, for example, when a frame rate of the synchronization signal is set to 120 [fps], a frame rate at which each of the auxiliary light emitting units 13 emits auxiliary light and a frame rate at which each of the imaging units 15 captures an image are set to 30 [fps].

Note that a main component for controlling a light emission timing of the auxiliary light emitting unit 13 of each of the imaging devices 10 is not particularly limited. As a specific example, any of the imaging devices 10a to 10d may be set as a master, and the imaging device 10 operated as a master may control light emission timings of the auxiliary light emitting units 13 of the other imaging devices 10 operated as slaves.

Also, as another example, a configuration in which the imaging devices 10a to 10d are independently operated may be used. In this case, for example, the imaging devices 10a to 10d may share (for example, notify each other of) light emission states of the auxiliary light emitting units 13 and control operations (for example, a light emission timing and a light emission time) of their own auxiliary light emitting units 13 according to a light emission state (for example, a light emission timing and a light emission time) of the auxiliary light emitting unit 13 of a partner.

That is, the auxiliary light emitting units 13a to 13d are controlled such that they emit auxiliary light at different timings (that is, auxiliary light beams are emitted in a time-division manner) based on control timings shown in FIG. 6. Accordingly, it is possible to prevent occurrence of a situation in which auxiliary light beams emitted from the auxiliary light emitting units 13 of the imaging devices 10 interfere with each other even when three or more imaging devices 10 are linked to one another.

Note that, when three or more imaging devices 10 are operated as in the control system 1 according to Modified Example 1, not all of the auxiliary light emitting units 13 of the imaging device 10 are necessarily controlled such that they emit auxiliary light in a time-division manner.

Figure 7:
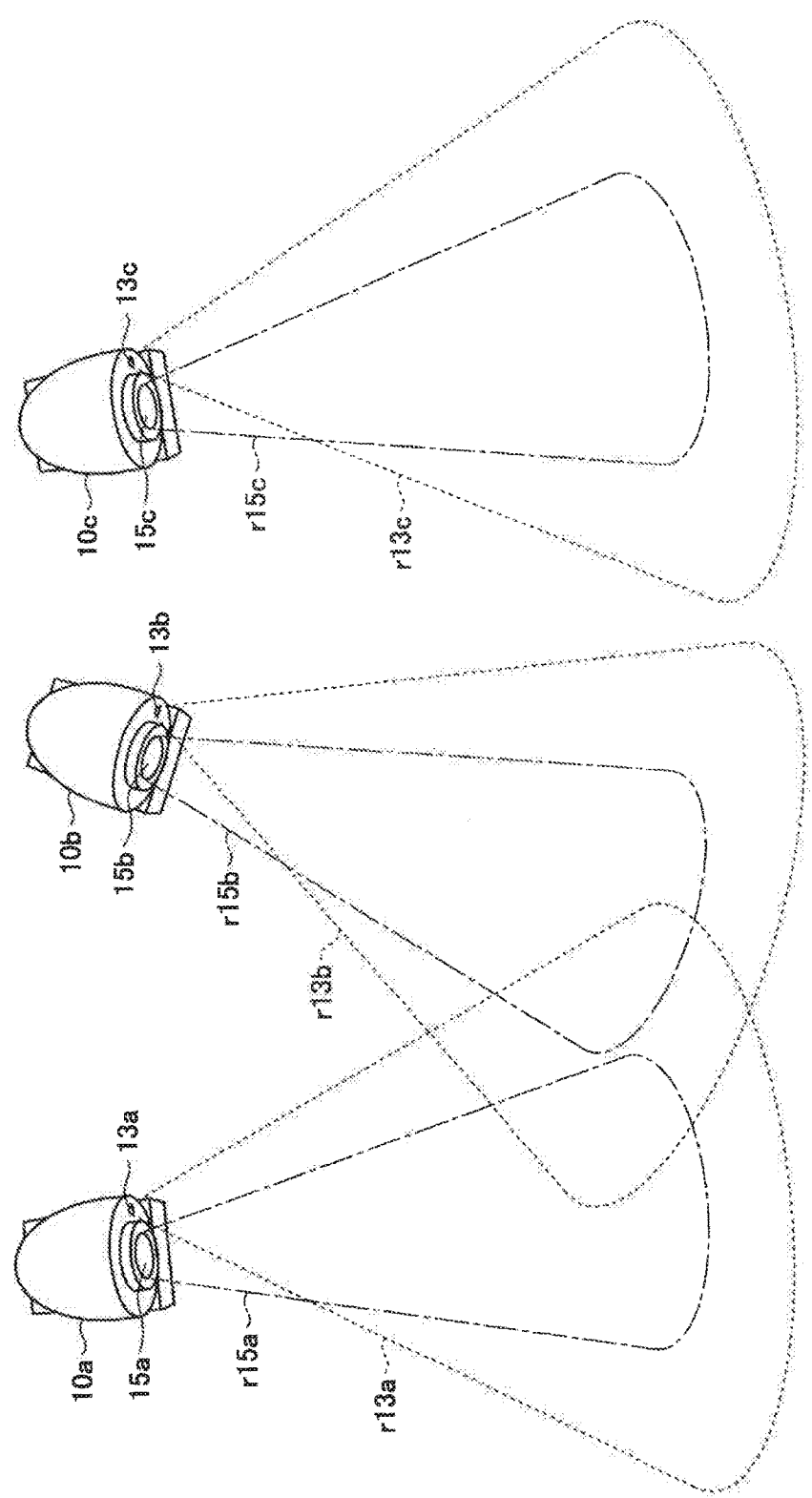
FIG. 7 is an explanatory diagram for describing an overview of a control system 1 according to Modified Example 1.

For example, FIG. 7 is an explanatory diagram for describing an overview of the control system 1 according to Modified Example 1 and shows an example of an operation environment in which 10a to 10c are operated.

In FIG. 7, a reference sign r15a schematically indicates an imaging region of the imaging unit 15a of the imaging device 10a. Similarly, a reference sign r15b schematically indicates an imaging region of the imaging unit 15b of the imaging device 10b. In addition, a reference sign r15c schematically indicates an imaging region of the imaging unit 15c of the imaging device 10c.

In addition, a reference sign r13a schematically indicates a region that is illuminated with auxiliary light emitted from the auxiliary light emitting unit 13a. Similarly, a reference sign r13b schematically indicates a region that is illuminated with auxiliary light emitted from the auxiliary light emitting unit 13b. In addition, a reference sign r13c schematically indicates a region that is illuminated with auxiliary light emitted from the auxiliary light emitting unit 13c.

In the example shown in FIG. 7, the region r13b illuminated with auxiliary light emitted from the auxiliary light emitting unit 13b overlaps the imaging region r15a of the imaging unit 15a. Therefore, in the example shown in FIG. 7, when the imaging unit 15a captures an image of the imaging region r15a, the imaging region r15a is illuminated with auxiliary light emitted from the auxiliary light emitting unit 13a along with the auxiliary light emitted from the auxiliary light emitting unit 13a.

Similarly, the region r13a illuminated with auxiliary light emitted from the auxiliary light emitting unit 13a overlaps the imaging region r15b of the imaging unit 15b. Therefore, in the example shown in FIG. 7, when the imaging unit 15b captures an image of the imaging region r15b, the imaging region r15b is illuminated with auxiliary light emitted from the auxiliary light emitting unit 13a along with auxiliary light emitted from the auxiliary light emitting unit 13b.

That is, in the example shown in FIG. 7, in the imaging regions r15a and r15b, auxiliary light beams emitted from the auxiliary light emitting units 13a and 13b interfere with each other, and an influence of the interference is manifested on images captured by the imaging units 15a and 15b in some cases.

On the other hand, the region r13e illuminated with auxiliary light emitted from the auxiliary light emitting unit 13c does not overlap the imaging regions r15a and r15b of the imaging units 15a and 15b. That is, when the imaging unit 15a captures an image of the imaging region r15a, if auxiliary light is emitted from the auxiliary light emitting unit 13c, the imaging region r15a is not illuminated with the auxiliary light. This is similar to a case in which the imaging unit 15b captures an image of the imaging region r15b.

Therefore, in the configuration shown in FIG. 7, it is not necessary to control the auxiliary light emitting unit 13c to always emit auxiliary light together with the auxiliary light emitting units 13a and 13b in a time-division manner. That is, when the plurality of imaging devices 10 are linked to one another, at least only the imaging devices 10 for which auxiliary light beams emitted from the auxiliary light emitting units 13 interfere with each other may he linked, but it is not necessary to always link all of the imaging devices 10. In other words, it is not necessary to always link the imaging devices 10 for which auxiliary light beams emitted from the auxiliary light emitting units 13 do not interfere with each other.

Note that some of the plurality of imaging devices 10 that will be linked may be determined in advance, for example, based on previous settings.

Also, as another example, any (for example, a master) of the plurality of imaging devices 10 may identify the imaging devices 10 to be linked according to positions in which the imaging devices 10 are installed and orientations thereof.

Specifically, it is possible to estimate an imaging region of the imaging unit 15 based on an installation position and an orientation of the imaging device 10 and an angle of view of the imaging unit 15. In addition, it is possible to estimate a region illuminated with auxiliary light emitted from the auxiliary light emitting unit 13 based on the installation position and the orientation of the imaging device 10 and a radiation angle of the auxiliary light emitting unit 13.

That is, in this case, for example, the imaging device 10 operated as a master acquires information indicating positions and orientations of the imaging devices 10, information indicating angles of view of the imaging units 15 of the imaging devices 10, and information indicating radiation angles of the auxiliary light emitting units 13 of the imaging devices 10 from the imaging devices 10. Then, the imaging device 10 operated as a master specifies a plurality of imaging devices 10 in which auxiliary light beams interfere with each other based on the acquired information of the imaging devices 10, and may identify the specified plurality of imaging devices 10 as the imaging devices 10 to be linked to one another.

Also, as another example, the plurality of imaging devices 10 may share (for example, notify each other of) information (that is, information indicating a position and an orientation, an angle of view of the imaging unit 15, and a radiation angle of the auxiliary light emitting unit 13), and may identify another imaging device 10 for which a link is necessary. In this case, each of the imaging devices 10 specifies another imaging device 10 that emits auxiliary light toward an imaging region of its own imaging unit 15 based on information acquired from the other imaging device 10, and may recognize the specified imaging device 10 as a link target.

In addition, as still another example, each of the plurality of imaging devices 10 may specify another imaging device 10 serving as a link target based on a state related to emission of auxiliary light from each of the imaging devices 10 and an image captured by its own imaging unit 15.

Specifically, any (for example, a master) of the plurality of imaging devices 10 sequentially emits auxiliary light toward the imaging devices 10 in a time-division manner, notifies the imaging devices 10 of information of the imaging device 10 that emits the auxiliary light, and causes the imaging devices 10 to capture an image in synchronization with emission of the auxiliary light.

Each of the imaging devices 10 analyzes an image captured by its own imaging unit 15, and determines whether an imaging region of its own imaging unit 15 is illuminated according to emission of auxiliary light from another imaging device 10. Then, each of the imaging devices 10 identifies the other imaging device 10 that emits auxiliary light based on information notified of when the imaging region of its own imaging unit 15 is illuminated and may identify the other imaging device 10 as a link target.

The example of control when three or more imaging devices 10 are operated has been described above as Modified Example 1 with reference to FIG. 6 and FIG. 7.

<<1.4.2. Modified Example 2: Example of System Configuration>>

Figure 8:
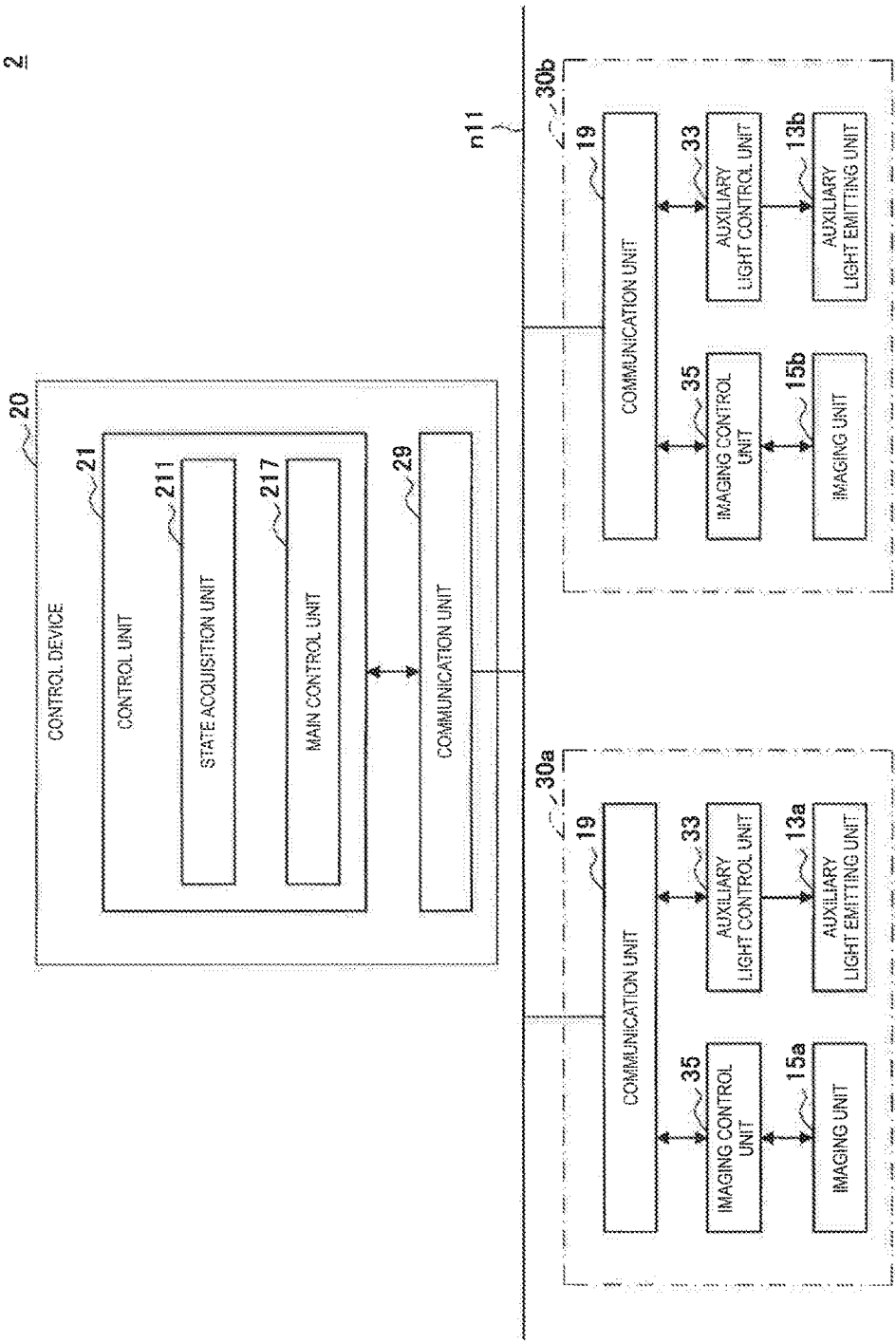
FIG. 8 is a block diagram showing an example of a configuration of a control system according to Modified Example 2.

Next, as Modified Example 2, an example of a system configuration of a control system 1 according to the embodiment will be described with reference to FIG. 8. FIG. 8 is a block diagram showing an example of a configuration of a control system according to Modified Example 2. Note that, when a control system according to Modified Example 2 is distinguished from the control system 1 according to the above-described embodiment, it will be referred to as a "control system 2" below in some cases.

In the control system 1 according to the above-described embodiment, each of the imaging devices 10 includes the control unit 1 and the control unit 11 controls operations of the auxiliary light emitting unit 13 and the imaging unit 15 of the imaging device 10. On the other hand, in the control system 2 according to Modified Example 2, as shown in FIG. 8, the control device 20 is provided, and the control device 20 controls operations of the auxiliary light emitting unit 13 and the imaging unit 15 of each imaging device. Therefore, the control system 2 according to Modified Example 2 will he described below in detail. Note that, in this description, in order to distinguish an imaging device according to Modified Example 2 from the imaging device 10 according to the above-described embodiment, it will be referred to as an "imaging device 30" in some eases.

As shown in FIG. 8, the control system 2 according to Modified Example 2 includes a control device 20 and a plurality of imaging devices 30. Note that, in this description, the control system 2 including imaging devices 30a and 30b as shown in FIG. 8 as the plurality of imaging devices 30 is described, but the number of imaging devices 30 is not necessarily limited to two. In addition, since the imaging devices 30a and 30b have the same configuration, the imaging device 30a will be described in detail, and details of the configuration of the imaging device 30b will not be described.

The imaging device 30a includes the auxiliary light emitting unit 13a, the imaging unit 15a, the communication unit 19, an auxiliary light control unit 33, and the imaging control unit 35. Note that the auxiliary light emitting unit 13a and the imaging unit 15a correspond to the auxiliary light emitting unit 13a and the imaging unit 15a according to the above-described embodiment (refer to FIG. 4).

In addition, the communication unit 19 is an interface for the auxiliary light emitting unit 13a and the imaging unit 15a to transmit and receive information to and from an external device (for example, the control device 20) connected through the transfer path n11. Also, as long as the auxiliary light emitting unit 13a and the imaging unit 15a can transmit and receive information to and from the external device connected through the transfer path n11, a form of the transfer path n11, a configuration of the communication unit 19 and a communication method are not particularly limited. Note that, when the auxiliary light emitting unit 13a and the imaging unit 15a transmit and receive information to and from the external device through the transfer path n11 below, the information is transmitted and received through the communication unit 19 even if this is not specifically described.

The auxiliary light control unit 33 is a component for controlling an operation of the auxiliary light emitting unit 13a emitting auxiliary light, and corresponds to the auxiliary light control unit 113 according to the above-described embodiment (refer to FIG. 4). That is, the auxiliary light control unit 33 controls a light emission timing of the auxiliary light emitting unit 13a based on a control signal supplied from the control device 20 to be described below. In this case, the auxiliary light control unit 33 may control a light emission time of the auxiliary light emitting unit 13a based on the supplied control signal.

The imaging control unit 35 is a component for controlling an operation of the imaging unit 15a capturing an image and corresponds to the imaging control unit 115 according to the above-described embodiment (refer to FIG. 4). That is, the imaging control unit 35 controls an imaging timing of the imaging unit 15a. based on a control signal supplied from the control device 20 to be described below. In this case, the imaging control unit 35 may control an imaging time of the imaging unit 15a based on the supplied control signal.

The control device 20 includes a control unit 21 and a communication unit 29. In addition, the control unit 21 includes a state acquisition unit 211 and a main control unit 217. Note that the state acquisition unit 211 and the main control unit 217 according to Modified Example 2 correspond to the state acquisition unit 111 and the main control unit 117 according to the above-described embodiment (refer to FIG. 4).

The communication unit 29 is an interface for components within the control device 20 to transmit and receive information to and from an external device (for example, the imaging devices 30a and 30b) connected through the transfer path n11. Note that, as long as the components within the control device 20 can transmit and receive information to and from the external device connected through the transfer path n11, a form of the transfer path n11, a configuration of the communication unit 29, and a communication method are not particularly limited. In addition, when the components within the control device 20 transmit and receive information to and from the external device through the transfer path n11 below, the information is transmitted and received through the communication unit 29 even if this is not specifically described.

The state acquisition unit 211 acquires light emission states of the auxiliary light emitting units 13a and 13b from a predetermined acquisition source. Also, as light emission states of the auxiliary light emitting units 13a and 13b, similarly to the control system 1 according to the above-described embodiment, for example, control parameters (for example, for indicating a light emission interval of auxiliary light) for the auxiliary light emitting units 13a and 13b to emit auxiliary light are exemplified.

In addition, as long as the state acquisition unit 211 can acquire light emission states of the auxiliary light emitting units 13a and 13b, an acquisition source of the light emission state is not particularly limited. As a specific example, light emission states of the auxiliary light emitting units 13a and 13b may be stored in advance in a storage region (for example, a storage region provided within the control device 20) which is readable by the state acquisition unit 211. Also, as another example, the state acquisition unit 211 may acquire light emission states of the auxiliary light emitting units 13a and 13b as a user input. In this case, a manipulation interface for a user to set control parameters may be provided in the control device 20. In addition, as still another example, the state acquisition unit 211 may acquire light emission states of the auxiliary light emitting units 13a and 13b from an external device connected via a network.

Also, as still another example, a light emission state of the auxiliary light emitting unit 13 may be stored in advance, by the auxiliary light emitting unit 13 itself, or in the imaging device 30 with which the auxiliary light emitting unit 13 is associated (for example, attached). In this case, the state acquisition unit 211 may acquire a light emission state of the auxiliary light emitting unit 13 from the imaging device 30 with which the auxiliary light emitting unit 13 is associated through the transfer path n11.

As described above, the state acquisition unit 211 acquires light emission states of the auxiliary light emitting units 13a and 13b (for example, light emission intervals of the auxiliary light emitting units 13a and 13b) and outputs the acquired light emission states of the auxiliary light emitting units 13a and 13b to the main control unit 217.

Also, operations of the main control unit 217 are similar to those of the main control unit 117 according to the above-described embodiment (refer to FIG. 4). That is, the main control unit 217 generates a synchronization signal for connecting timings at which the auxiliary light emitting units 13*a* and 13*b* emit auxiliary light based on light emission slates of the auxiliary light emitting units 13*a* and 13*b*.

When the synchronization signal is generated, the main control unit 217 sets light emission timings of the auxiliary light emitting units 13*a* and 13*b* such that the auxiliary light emitting units 13*a* and 13*b* emit auxiliary light at different timings (that is, auxiliary light beams are emitted in a time-division manner).

In addition, the main control unit 217 may also set timings at which the imaging units 15*a* and 15*b* capture an image. In this case, the main control unit 217 sets the imaging timing of the imaging unit 15*a* such that the imaging unit 15*a* captures an image in synchronization with a light emission timing of the auxiliary light emitting unit 13*a*. Similarly, the main control unit 217 sets the imaging timing of the imaging unit 15*b* such that the imaging unit 15*b* captures an image in synchronization with a light emission timing of the auxiliary light emitting unit 13*b*.

Then, the main control unit 217 supplies a control signal (for example, a control pulse) to the auxiliary light control unit 113 of the imaging device 10*a* through the transfer path n11 according to the set light emission timing of the auxiliary light emitting unit 13*a*. When the control signal is received, the auxiliary light control unit 113 of the imaging device 10*a* controls an operation of the auxiliary light emitting unit 13*a* emitting auxiliary light (in particular, a light emission timing of the auxiliary light emitting unit 13*a*) based on the control signal.

In addition, the main control unit 217 supplies a control signal (for example, a control pulse) to the imaging control unit 115 of the imaging device 10*a* through the transfer path nil according to the set imaging timing of the imaging unit 15*a*. When the control signal is received, the imaging control unit 115 of the imaging device 10*a* controls an operation of the imaging unit 15*a* capturing an image (in particular, an imaging timing of the imaging unit 15*a*).

Similarly, the main control unit 217 supplies a control signal (for example, a control pulse) to the auxiliary light control unit 113 of the imaging device 10*b* through the transfer path nil according to the set light emission timing of the auxiliary light emitting unit 13*b*. When the control signal is received, the auxiliary light control unit 113 of the imaging device 10*b* controls an operation of the auxiliary light emitting unit 13*b* emitting auxiliary light (in particular, a light emission timing of the auxiliary light emitting unit 13*a*) based on the control signal.

In addition, the main control unit 217 supplies a control signal (for example, a control pulse) to the imaging control unit 115 of the imaging device 10*b* through the transfer path n11 according to the set imaging timing of the imaging unit 15*b*. When the control signal is received, the imaging control unit 115 of the imaging device 10*b* controls an operation of the imaging unit 15*b* capturing an image (in particular, an imaging timing of the imaging unit 15*b*).

According to the configuration described above, the control system 2 according to Modified Example 2 performs control such that the auxiliary light emitting units 13*a* and 13*b* emit auxiliary light at different timings (that is, auxiliary light beams are emitted in a time-division manner), in such a configuration, similarly to the control system 1 according to the above-described embodiment, the control system 2 according to Modified Example 2 can prevent occurrence of a situation in which auxiliary light beams emitted from the auxiliary light emitting units 13*a* and 13*b* interfere with each other and suppress an influence of the interference from being manifested. That is, according to the control system 2 of Modified Example 2, it is possible to implement a more suitable imaging environment even under a situation in which auxiliary light is emitted from the plurality of auxiliary light emitting units 13 (that is, light sources).

1.4.3. Modified Example 3: Example of Functional Configuration>>

Next, a control system 3 according to Modified Example 3 will be described. In the above-described embodiment, for example, the imaging device 10*a* acquires a light emission state of the auxiliary light emitting unit lab associated with another imaging device 10*b* through communication via the transfer path n11 and controls an operation (for example, a light emission timing) of the auxiliary light emitting unit 13*a* associated with the imaging device 10*a* based on the light emission state. On the other hand, in Modified Example 3, the imaging device 10*a* acquires a light emission state of the auxiliary light emitting unit 13*b* that is controlled by the imaging device 10*b* using a method different from direct communication with the other imaging device 10*b*, and controls an operation of the auxiliary light emitting unit 13*a* associated with the imaging device 10*a* based on the acquired light emission state.

Figure 9:
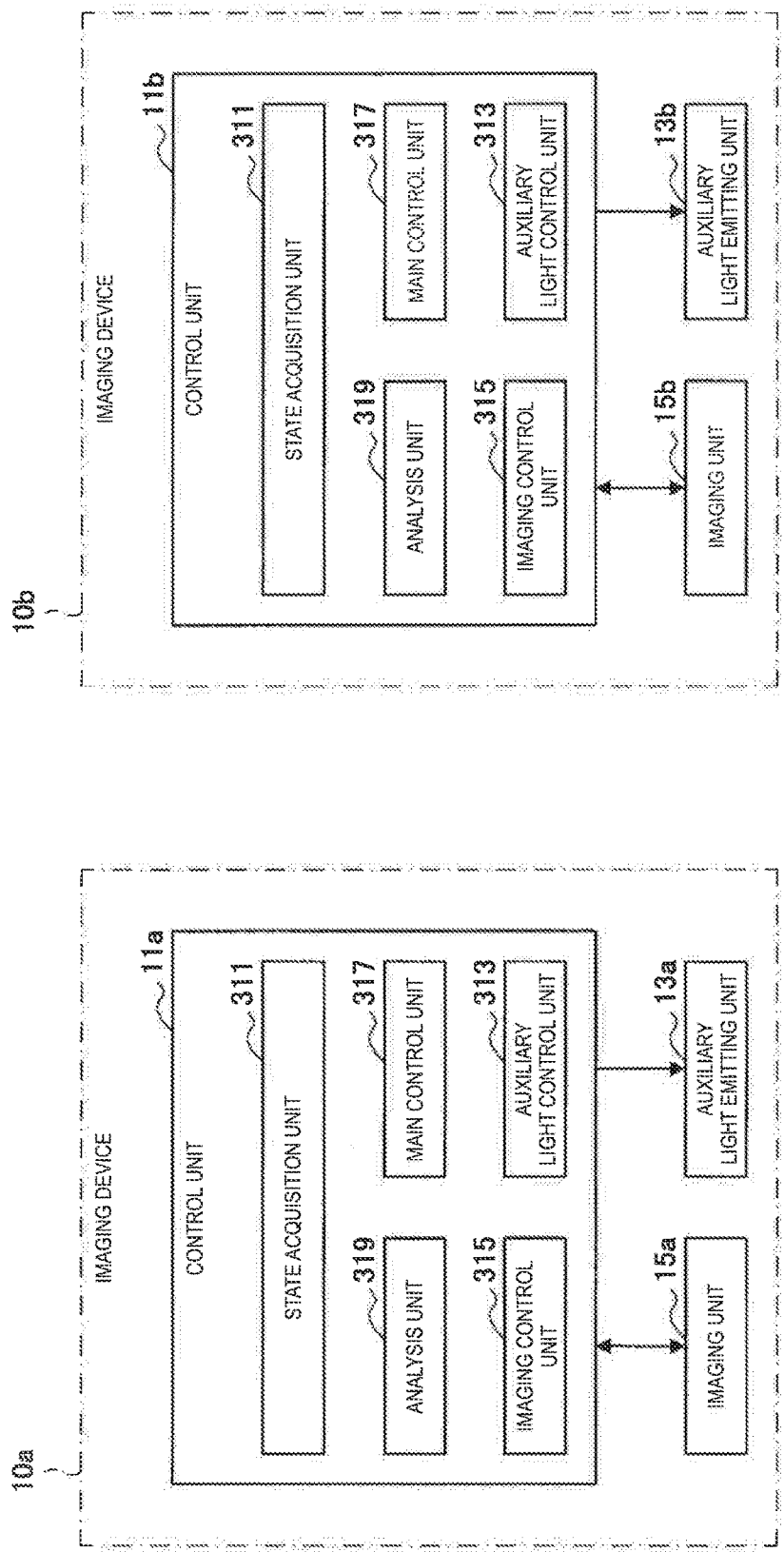
FIG. 9 is a block diagram showing an example of a functional configuration of a control system according to Modified Example 3.

Therefore, details of the control system 3 according to Modified Example 3 will be described with reference to FIG. 9 with a focus particularly on a configuration of the imaging device 10. FIG. 9 is a block diagram showing an example of a functional configuration of the control system 3 according to Modified Example 3. Note that, in this description, similarly to the control system 1 according to the above-described embodiment (refer to FIG. 4), the control system 3 including the imaging devices 10*a* and 10*b* will he described. In addition, as shown in FIG. 9, in the control system 3 according to Modified Example 3, since the imaging devices 10*a* and 10*b* have the same configuration, the imaging device 10*a* will he described in detail, and details of a configuration of the imaging device 10*b* will not be described.

As shown in FIG. 9, the imaging device 10*a* according to Modified Example 3 has the control unit 11*a* whose configuration is different from that of the imaging device 10*a* according to the above-described embodiment (refer to FIG. 4). Therefore, in this description, a configuration of the control unit 11*a* will be described with a focus particularly on parts different from those of the imaging device 10*a* according to the above-described embodiment.

The control unit 11*a* includes a state acquisition unit 311, a main control unit 317, an auxiliary light control unit 313, an imaging control unit 315, and an analysis unit 319.

The auxiliary light control unit 313 corresponds to the auxiliary light control unit 113 of the imaging device 10*a* according to the above-described embodiment (refer to FIG. 4), That is, the auxiliary light control unit 313 controls an operation of the auxiliary light emitting unit 13*a* emitting auxiliary light based on a control signal supplied from the main control unit 317 to be described below.

The imaging control unit 315 corresponds to the imaging control unit 115 of the imaging device 10*a* according to the above-described embodiment (refer to FIG. 4). That is, the imaging control unit 315 controls an operation of the imaging unit 15*a* capturing an image based on a control signal supplied from the main control unit 317 to be described below.

In addition, the imaging control unit 315 according to Modified Example 3 causes the imaging unit 15*a* to capture an image of the imaging region r15*a* at each of timings that are determined in advance (for example, at a predetermined frame rate), and sequentially outputs the captured images to the analysis unit 319 in time series. Also, in this case, the image captured by the imaging unit 15a may be a so-called through image (for example, a thinned image).

The analysis unit 319 sequentially acquires the images of the imaging region r15a captured by the imaging unit 15a from the imaging control unit 315 in time series. The analysis unit 319 performs image analysis on the images acquired in time series and thus calculates a luminance distribution of the images.

Then, the analysis unit 319 sequentially outputs information indicating the calculated luminance distribution of the images to the state acquisition unit 311 in time series.

The state acquisition unit 311 sequentially acquires information indicating luminance distributions of a series of images of the imaging region r15a captured by the imaging unit 15a from the analysis unit 319 in time series. Then, the state acquisition unit 311 estimates a light emission state of the auxiliary light emitting unit 13b of another imaging device 10b that emits auxiliary light toward the imaging region r15a based on the information indicating luminance distributions of the images acquired in time series.

Specifically, when the auxiliary light emitting unit 13b of the imaging device 10b emits auxiliary light toward the imaging region r15a of the imaging unit 15a, brightness of the imaging region r15a changes according to emission of the auxiliary light. Therefore, a change in brightness of the imaging region r15a is manifested as a change in the luminance distribution of the image captured by the imaging unit 15a. The state acquisition unit 311 according to Modified Example 3 uses such a characteristic and estimates a light emission state of another auxiliary light emitting unit 13b that emits auxiliary light toward the imaging region r15a, Also, brightness of the imaging region r15a may be changed by auxiliary light emitted from the auxiliary light emitting unit 13a. In such a case, the state acquisition unit 311 acquires information indicating control content (for example, a light emission timing and an amount of light emission) of the auxiliary light emitting unit 13a from the auxiliary light control unit 113 of the imaging device 10a, and thus estimates a change in brightness of the imaging region r15a according to auxiliary light emitted from the auxiliary light emitting unit 13a. Then, the state acquisition unit 311 compares information indicating the luminance distribution of the images acquired in time series from the analysis unit 319 with the estimation result of a change in brightness of the imaging region r15a according to auxiliary light emitted from the auxiliary light emitting unit 13a, and thus may estimate a light emission state of the auxiliary light emitting unit 13b.

As described above, the state acquisition unit 311 estimates a light emission state of another auxiliary light emitting unit 13b that emits auxiliary light toward the imaging region r15a and outputs the estimation result to the main control unit 317.

The main control unit 317 acquires the estimation result of the light emission state of the other auxiliary light emitting unit 13b that emits auxiliary light toward the imaging region r15a from the state acquisition unit 311. Then, the main control unit 317 sets a light emission timing of the auxiliary light emitting unit 13a based on the acquired estimation result of the light emission state of the other auxiliary light emitting unit 13b. Specifically, based on the estimation result of the light emission state of the auxiliary light emitting unit 13b, the main control unit 317 sets a light emission timing of the auxiliary light emitting unit 13a such that the auxiliary light emitting units 13a and 13b emit auxiliary light at different timings (that is, auxiliary light beams are emitted in a time-division manner).

In addition, the main control unit 317 may also set timings at which the imaging units 15a capture an image. In this case, the main control unit 317 sets the imaging timing of the imaging unit 15a such that the imaging unit 15a captures an image in synchronization with a light emission timing of the auxiliary light emitting unit 13a.

Note that the following operations are similar to those when the imaging device 10a according to the above-described embodiment (refer to FIG. 4) controls operations of the auxiliary light emitting unit 13a and the imaging unit 15a. That is, the main control unit 317 supplies a control signal (for example, a control pulse) to an auxiliary light control unit 413 according to the set light emission timing of the auxiliary light emitting unit 13a. The auxiliary light control unit 313 controls an operation of the auxiliary light emitting unit 13a emitting auxiliary light based on the control signal supplied from the main control unit 317.

In addition, the main control unit 317 supplies a control signal (for example, a control pulse) to the imaging control unit 315 according to the set imaging timing of the imaging unit 15a. The imaging control unit 315 controls an operation of the imaging unit 15a capturing an image based on the control signal supplied from the main control unit 317.

As described above, when operations of the auxiliary light emitting unit 13a and the imaging unit 15a are controlled based on the control signal from the main control unit 317, a light emission timing of the auxiliary light emitting unit 13a and an imaging timing of the imaging unit 15a are synchronized.

In addition, the imaging device 10a controls an operation of the auxiliary light emitting unit 13a such that the auxiliary light emitting unit 13a emits auxiliary light at a timing different from that of another auxiliary light emitting unit 13b that emits auxiliary light toward the imaging region r15a of the imaging unit 15a (that is, auxiliary light beams are emitted in a time-division manner).

According to the above-described configuration, similarly to the control system 1 according to the above-described embodiment, the control system 3 according to Modified Example 3 can prevent occurrence of a situation in which auxiliary light beams emitted from the auxiliary light emitting units 13a and 13b interfere with each other and suppress an influence of the interference from being manifested. That is, according to the control system 3 of Modified Example 3, it is possible to implement a more suitable imaging environment even under a situation in which auxiliary light is emitted from the plurality of auxiliary light emitting units 13 (that is, light sources).

In addition, in the control system 3 according to Modified Example 3, each of the imaging devices 10 sequentially monitors a change in brightness of an imaging region of the imaging unit 15 that is controlled by the imaging device 10 itself based on the image captured by the imaging unit 15 and controls an operation of the auxiliary light emitting unit 13 that is controlled by the imaging device 10 itself according to the monitoring result. Therefore, in the control system 3 according to Modified Example 3, even under a situation in which auxiliary light is emitted from a device outside the control system 3 to imaging regions of the imaging units 15 of the imaging devices 10, it is possible to prevent occurrence of a situation in which a plurality of auxiliary light beams interfere with each other and it is possible to implement a more suitable imaging environment.

<<1.4.4. Modified Example 4: Example of Functional Configuration>>

Next, a control system 4 according to Modified Example 4 will be described. In the above-described Modified Example 3, each of the imaging devices 10 acquires a light emission state of another auxiliary light emitting unit 13 that emits auxiliary light toward an imaging region of the imaging unit 15 based on the image captured by the imaging unit 15 whose operation is controlled by the imaging device 10 itself On the other hand, as long as each of the imaging devices 10 can acquire a light emission state of another auxiliary light emitting unit 13 that emits auxiliary light toward an imaging region of the imaging unit 15 whose operation is controlled by the imaging device 10 itself, a method and configuration thereof are not particularly limited. Therefore, in Modified Example 4, another example of the control system in which each of the imaging devices 10 uses a method different from direct communication with another imaging device 10 and can acquire a light emission state of the auxiliary light emitting unit 13 that is controlled by the other imaging device 10 will be described.

Figure 10:
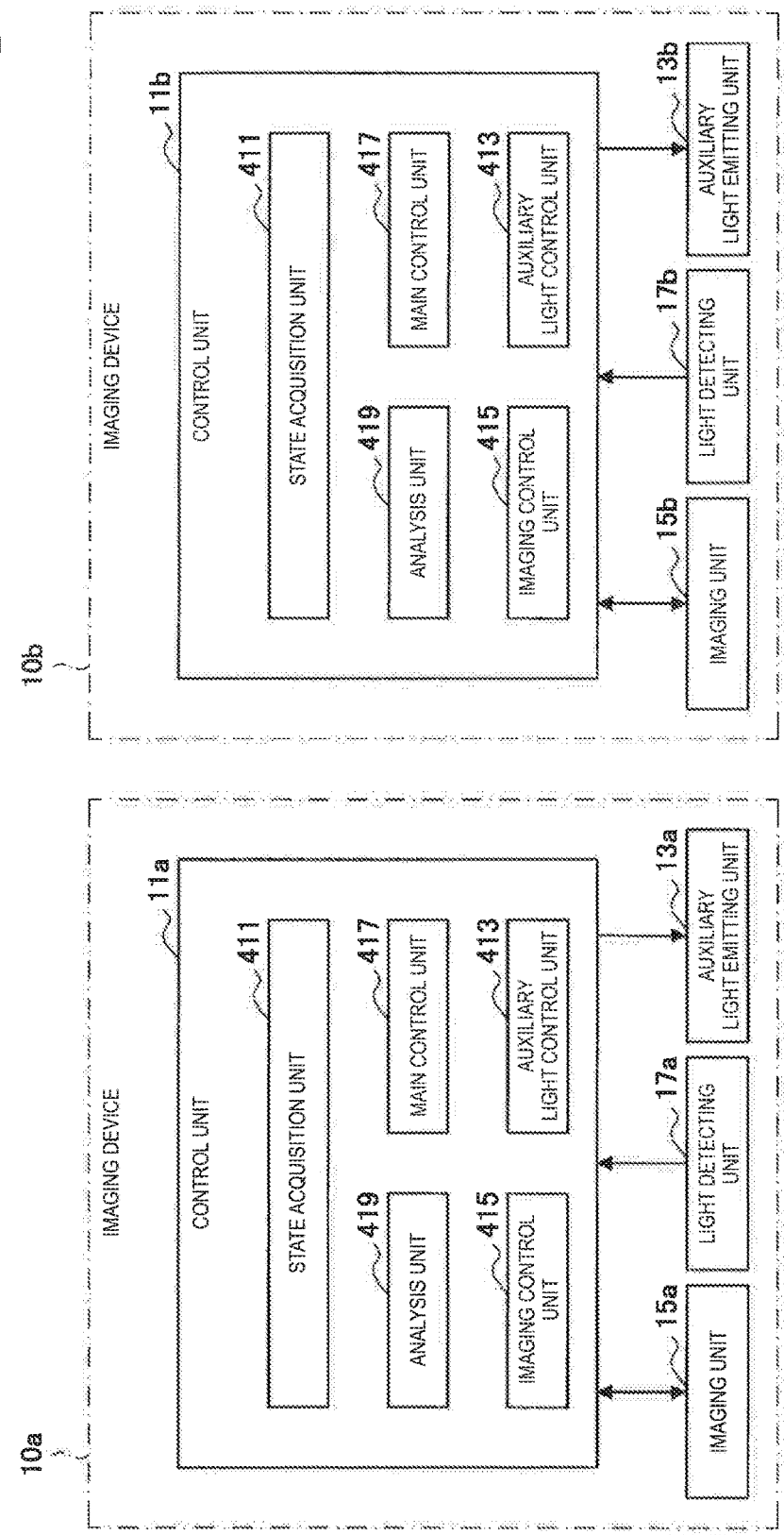
FIG. 10 is a block diagram showing an example of a functional configuration of a control system according to Modified Example 4.

The imaging device 10 according to Modified Example 4 emits auxiliary light of a specific light emission pattern to the auxiliary light emitting unit 13 whose operation is controlled by the imaging device 10 itself, and thus notifies the other imaging device 10 of the light emission state of the auxiliary light emitting unit 13 according to the light emission pattern. Therefore, an example of a functional configuration of the control system 4 according to Modified Example 4 will be described below with reference to FIG. 10 with a focus particularly on a configuration of the imaging device 10. FIG. 10 is a block diagram showing an example of a functional configuration of the control system 4 according to Modified Example 4.

Note that, in this description, similarly to the control system 1 according to the above-described embodiment (refer to FIG. 4), the control system 4 including the imaging devices 10a and 10b will be described. In addition, as shown in FIG. 10, in the control system 4 according to Modified Example 4, since the imaging devices 10a and 10b have the same configuration, the imaging device 10a will be described in detail, and details of a configuration of the imaging device 10b will not be described.

As shown in FIG. 10, the imaging device 10a according to Modified Example 4 includes the control unit 11a, the auxiliary light emitting unit 13a, the imaging unit 15a, and a light detecting unit 17a. In addition, the control unit according to Modified Example 4 includes a state acquisition unit 411, a main control unit 417, the auxiliary light control unit 413, an imaging control unit 415, and an analysis unit 419. Note that, since the auxiliary light emitting unit 13a and the imaging unit 15a are similar to those of the imaging device 10a according to the above-described embodiment (refer to FIG. 4), detailed descriptions thereof will be omitted. Note that, when the light detecting unit 17a of the imaging device 10a and the light detecting unit 17 of the imaging device 10b are not particularly distinguished, they will be simply referred to as a "light detecting unit 17" below in some cases.

The auxiliary light control unit 413 corresponds to the auxiliary light control unit 113 of the imaging device 10a according to the above-described embodiment (refer to FIG. 4). That is, the auxiliary light control unit 413 controls an operation of the auxiliary light emitting unit 13a emitting auxiliary light based on a control signal supplied from the main control unit 417 to be described below.

The imaging control unit 415 corresponds to the imaging control unit 115 of the imaging device 10a according to the above-described embodiment (refer to FIG. 4). That is, the imaging control unit 415 controls an operation of the imaging unit 15a capturing an image based on a control signal supplied from the main control unit 417 to be described below.

Note that, in the following description, in order to more easily understand characteristics of configurations of the imaging device 10a, description will focus separately particularly on a configuration for an operation of "notification of a light emission state" and a configuration for an operation of "acquisition of a light emission state."

(Notification of Light Emission State)

First, a configuration of the imaging device 10a will be described with a focus on an operation in which the imaging device 10a notifies another imaging device 10b of a light emission state of the auxiliary light emitting unit 13a that is controlled by the imaging device 10a itself.

The auxiliary light control unit 413 of the imaging device 10a according to Modified Example 4 causes the auxiliary light emitting unit 13a to emit auxiliary light of a light emission pattern according to a light emission state of the auxiliary light emitting unit 13a at a predetermined timing (that is, light or a blinking), and thus notifies another imaging device 10b of the light emission state of the auxiliary light emitting unit 13a.

Also, specific content of which the auxiliary light control unit 413 of the imaging device 10a notifies another imaging device 10b as a light emission state of the auxiliary light emitting unit 13a using a light emission pattern of auxiliary light is similar to that of the control system 1 according to the above-described embodiment (refer to FIG. 4).

Specifically, the auxiliary light control unit 413 of the imaging device 10a may notify another imaging device 10b of control parameters for the auxiliary light emitting unit 13a to emit auxiliary light (for example, a light emission interval of auxiliary light) using a light emission pattern of auxiliary light. In addition, as another example, the auxiliary light control unit 413 of the imaging device 10a may notify another imaging device 10b of identification information for specifying a light emission state of the auxiliary light emitting unit 13a using a light emission pattern of auxiliary light.

Also, a timing at which the auxiliary light control unit 413 of the imaging device 10a notifies another imaging device 10b of a light emission state of the auxiliary light emitting unit 13a using a light emission pattern of auxiliary light is not particularly limited. As a specific example, the auxiliary light control unit 413 causes the auxiliary light emitting unit 13a to emit auxiliary light of a specific light emission pattern at a timing at which the imaging device 10a starts, and thus may notify another imaging device 10b of a light emission state of the auxiliary light emitting unit 13a.

(Acquisition of Light Emission State)

Next, a configuration of the imaging device 10a will he described with a focus on an operation in which the imaging device 10a acquires a light emission state of the auxiliary light emitting unit 13b based on auxiliary light that is emitted from the auxiliary light emitting unit 13b of another imaging device 10b.

The light detecting unit 17a includes a so-called sensor that detects a change in an intensity (for example, luminance) of received light and a change in ambient brightness. Here, the light detecting unit 17a configured to detect a change in ambient brightness (that is, a change in brightness of a predetermined detection area) will be described.

The light detecting unit 17a detects a change in brightness of the detection area and sequentially outputs the detection results to the analysis unit 419. In this case, when the auxiliary light emitting unit 13b emits auxiliary light toward the detection area of the light detecting unit 17a, the light detecting unit 17a detects a change in brightness according to emission of the auxiliary light.

The analysis unit 419 sequentially acquires the detection results from the light detecting unit 17a, analyzes the acquired detection results, and thus determines whether auxiliary light emitted from the auxiliary light emitting unit 13b of another imaging device 10b is detected.

As a specific example, the analysis unit 419 acquires information indicating control content (for example, a light emission timing and an amount of light emission) of the auxiliary light emitting unit 13a from the auxiliary light control unit 413 of the imaging device 10a, and thus may estimate a change in ambient brightness lei according to auxiliary light emitted from the auxiliary light emitting unit 13a.

That is, the analysis unit 419 compares the detection result acquired from the light detecting unit 17a with the estimation result of a change in ambient brightness according to auxiliary light emitted from the auxiliary light emitting unit 13a, and thus determines whether auxiliary light emitted from the auxiliary light emitting unit 13b is emitted. Then, when the comparison result is that they are different, the analysis unit 419 acquires a detection result of auxiliary light emitted from the auxiliary light emitting unit 13b based on a difference between the estimation result of a change in ambient brightness according to auxiliary light emitted from the auxiliary light emitting unit 13a and the detection result acquired from the light detecting unit 17a.

Also, the imaging device 10a is operated with another imaging device 10c, which is linked already, other than the imaging device 10b in some cases. In this case, the analysis unit 419 may estimate a change in ambient brightness according to the auxiliary light emitting unit 13c associated with the imaging device 10c based on information of the auxiliary light emitting unit 13c that has already been acquired when a link is established. Specifically, the analysis unit 419 may recognize a timing at which the auxiliary light emitting unit 13c emits auxiliary light based on a control result of the main control unit 117. In addition, the analysis unit 419 may recognize settings for the auxiliary light emitting unit 13c to emit auxiliary light (for example, a light emission interval and an amount of light emission) based on a light emission state of the auxiliary light emitting unit 13c that has already been acquired when a link is established.

As described above, when a detection result of auxiliary light emitted from the auxiliary light emitting unit 13b is acquired, the analysis unit 419 analyzes the detection result and thus specifies the light emission pattern of auxiliary light. Then, the analysis unit 419 outputs information indicating the specified light emission pattern of auxiliary light to the state acquisition unit 411.

The state acquisition unit 411 acquires information indicating a light emission pattern of auxiliary light from the analysis unit 419 and acquires a light emission state of the auxiliary light emitting unit 13b of the imaging device 10b based on the acquired information indicating a light emission pattern.

Specifically, data in which information indicating a light emission pattern of auxiliary light and specific information indicating a light emission state of the auxiliary light emitting unit 13 are associated may be stored in advance in a position which is readable by the state acquisition unit 411.

Then, the state acquisition unit 411 checks the information indicating a light emission pattern of auxiliary light acquired from the analysis unit 419 and the data and thus may acquire a light emission state of the auxiliary flight emitting unit 13b of the imaging device 10b.

As described above, the state acquisition unit 411 acquires a light emission state of the auxiliary light emitting unit 13b of the imaging device 10b, and outputs the acquired light emission state of the auxiliary light emitting unit 13b to the main control unit 417.

The main control unit 417 acquires the light emission state of the auxiliary light emitting unit 13b of the imaging device 10b from the state acquisition unit 411. Then, the main control unit 417 sets a light emission timing of the auxiliary light emitting unit 13a based on the acquired light emission state of the auxiliary light emitting unit 13b. Specifically, based on the light emission state of the auxiliary light emitting unit 13b, the main control unit 417 sets a light emission timing of the auxiliary light emitting unit 13a such that the auxiliary light emitting units 13a and 13b emit auxiliary light at different timings (that is, auxiliary light beams are emitted in a time-division manner).

In addition, the main control unit 417 may also set timings at which the imaging units 15a capture an image. In this case, the main control unit 417 sets an imaging timing of the imaging unit 15a such that the imaging unit 15a captures an image in synchronization with a light emission timing of the auxiliary light emitting unit 13a.

Note that the following operations are similar to those when the imaging device 10a according to the above-described embodiment (refer to FIG. 4) controls operations of the auxiliary light emitting unit 13a and the imaging unit 15a. That is, the main control unit 417 supplies a control signal (for example, a control pulse) to the auxiliary light control unit 413 according to the set light emission timing of the auxiliary light emitting unit 13a. The auxiliary light control unit 413 controls an operation of the auxiliary light emitting unit 13a emitting auxiliary light based on the control signal supplied from the main control unit 417.

In addition, the main control unit 417 supplies a control signal (for example, a control pulse) to the imaging control unit 415 according to the set imaging timing of the imaging unit 15a. The imaging control unit 415 controls an operation of the imaging unit 15a capturing an image based on the control signal supplied from the main control unit 417.

As described above, when operations of the auxiliary light emitting unit 13a and the imaging unit 15a are controlled based on the control signal from the main control unit 417, a light emission timing of the auxiliary light emitting unit 13a and an imaging timing of the imaging unit 15a are synchronized.

In addition, the imaging device 10a controls an operation of the auxiliary light emitting unit 13a such that the auxiliary light emitting unit 13a emits auxiliary light at a timing different from that of the auxiliary light emitting unit 13b of the imaging device 10b (that is, auxiliary light beams are emitted in a time-division manner).

According to the above-described configuration, similarly to the control system 1 according to the above-described embodiment, the control system 4 according to Modified Example 4 can prevent occurrence of a situation in which auxiliary light beams emitted from the auxiliary light emitting units 13a and 13b interfere with each other and suppress an influence of the interference from being manifested. That is, according to the control system 4 of Modified Example 4, it is possible to implement a more suitable imaging environment even under a situation in which auxiliary light is emitted from the plurality of auxiliary light emitting units 13 (that is, light sources).

In addition, in the control system 4 according to Modified Example 4, each of the imaging devices 10 sequentially monitors a change in ambient brightness (that is, a change in brightness of a detection area of the light detecting unit 17) based on a detection result of the light detecting unit 17 and controls an operation of the auxiliary light emitting unit 13 that is controlled by the imaging device 10 itself according to the monitoring result. Therefore, in the control system 4 according to Modified Example 4, even under a situation in which a device outside the control system 3 emits auxiliary light toward imaging regions of the imaging units 15 of the imaging devices 10, it is possible to prevent occurrence of a situation in which a plurality of auxiliary light beams interfere with each other and it is possible to implement a more suitable imaging environment.

[1.5. Summary]

As described above, the control system 1 according to the embodiment performs control such that the auxiliary light emitting units 13 of the plurality of imaging devices 10 emit auxiliary light at different timings (that is, auxiliary light beams are emitted in a time-division manner). In such a configuration, the control system 1 according to the embodiment can prevent occurrence of a situation in which auxiliary light beams emitted from the auxiliary light emitting units 13 of the plurality of imaging devices 10 interfere with each other and suppress an influence of the interference from being manifested. That is, according to the control system 1 of the embodiment, it is possible to implement a more suitable imaging environment even under a situation in which auxiliary light is emitted from the plurality of auxiliary light emitting units 13 (that is, light sources).

<2. Second Embodiment>

[2.1. Overview]

Next, a control system according to a second embodiment of the present disclosure will be described. The control system 1 according to the above-described first embodiment performs control such that the auxiliary light emitting units 13 of the plurality of imaging devices 10 emit auxiliary light at different timings (that is, auxiliary light beams are emitted in a time-division manner), and thus a more suitable imaging environment is implemented. On the other hand, when the auxiliary light emitting units 13 emit auxiliary light in a time-division manner, a period during which each of the auxiliary light emitting units 13 emits auxiliary light decreases as a multiplicity of time division increases (that is, as the number of auxiliary light emitting units 13 increases), and the multiplicity also has a limitation.

Therefore, a control system according to the embodiment controls a light intensity of auxiliary light emitted from each of the auxiliary light emitting units 13 according to a light emission state of each of the auxiliary light emitting units 13, and thus a more suitable imaging environment is implemented. In addition, in order to distinguish a control system according to the embodiment from the control system according to the above-described first embodiment, it will he described as a "control system 5" below in some cases.

Figure 11:
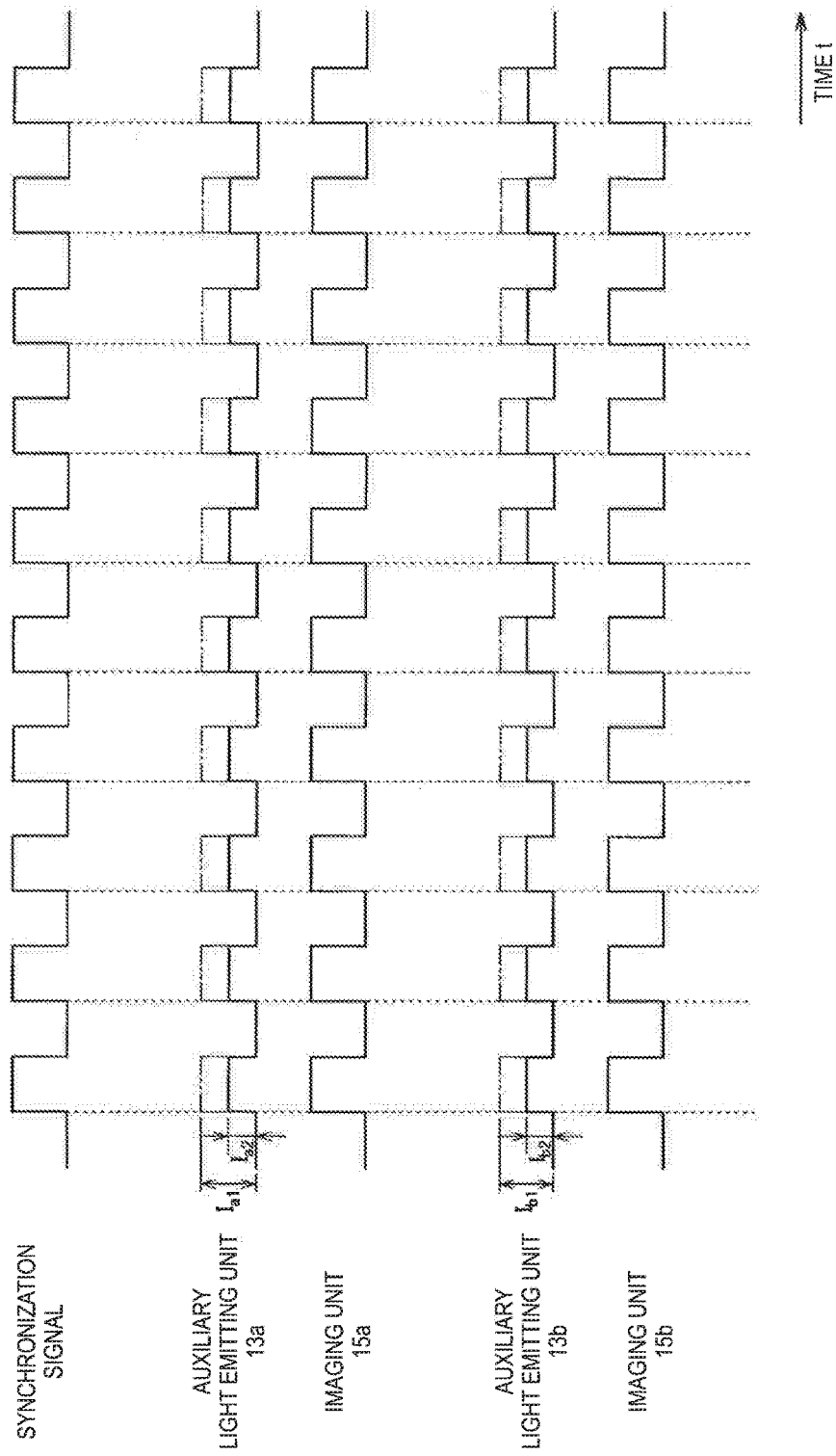
FIG. 11 is an explanatory diagram for describing schematic operations of a control system according to a second embodiment of the present disclosure.

For example, FIG. 11 is an explanatory diagram for describing schematic operations of the control system 5 according to the embodiment. FIG. 11 shows an example of a schematic timing chart showing timings at which the auxiliary light emitting units 13a and 13b emit auxiliary light and timings at which the imaging units 15a and 15b capture an image, and a lateral direction corresponds to a time axis. Note that, in FIG. 11, in order to more easily understand characteristics of the control system 5 according to the embodiment, a light intensity of auxiliary light emitted from the auxiliary light emitting unit 13 is schematically indicated by a height of a control pulse for controlling an operation of each of the auxiliary light emitting units 13.

In addition, in this description, the imaging devices 10a and 10b that are operated in the operation environment shown in FIG. 2 will be described. That is, as shown in FIG. 2, the region r13b illuminated with auxiliary light emitted from the auxiliary light emitting unit 13b overlaps the imaging region r15a of the imaging unit 15a.

In FIG. 11, a reference sign $I_{a1}$ schematically indicates a light intensity of auxiliary light emitted from the auxiliary light emitting unit 13a when only auxiliary light from the auxiliary light emitting unit 13a is emitted toward the imaging region r15a of the imaging unit 15a (that is, when the imaging device 10a alone is operated). On the other hand, a reference sign $I_{a2}$ schematically indicates a light intensity of auxiliary light emitted from the auxiliary light emitting unit 13a when auxiliary light from the auxiliary light emitting unit 13b is emitted toward the imaging region r15a of the imaging unit 15a (that is, when the imaging devices 10a and 10b are operated in linkage as shown in FIG. 2).

Similarly, a reference sign $I_{b1}$ schematically indicates a light intensity of auxiliary light emitted from the auxiliary light emitting unit 13b when only auxiliary light from the auxiliary light emitting unit 13b is emitted toward the imaging region r15b of the imaging unit 15b (that is, when the imaging device 10b alone is operated). On the other hand, a reference sign $I_{b2}$ schematically indicates a light intensity of auxiliary light emitted from the auxiliary light emitting unit 13b when auxiliary light from the auxiliary light emitting unit 13a is emitted toward the imaging region r15b of the imaging unit 15b (that is, when the imaging devices 10a and 10b are operated in linkage as shown in FIG. 2).

As shown in FIG. 2, when the auxiliary light emitting unit 13b emits auxiliary light toward the imaging region r15a of the imaging unit 15a along with the auxiliary light emitting unit 13a, the imaging region r15a becomes brighter according to a light intensity of auxiliary light emitted from the auxiliary light emitting unit 13b.

Therefore, as shown in FIG. 11, when auxiliary light is emitted from the plurality of auxiliary light emitting units 13 toward the imaging region r15a of the imaging unit 15a, the control system 5 according to the embodiment limits a light intensity of auxiliary light of each of the auxiliary light emitting units 13 and controls brightness of the imaging region r15a. In this case, for example, the imaging device 10a acquires a light emission state of the auxiliary light emitting unit 13b (for example, an amount of light emission) that is controlled by another imaging device 10b, and limits a light intensity of auxiliary light of the auxiliary light emitting unit 13a that is controlled by the imaging device 10a itself according to the acquired light emission state of the auxiliary light emitting unit 13b.

For example, when light intensities of auxiliary light beams emitted from the auxiliary light emitting units 13a and 13b are the same and the auxiliary light emitting units 13a and 13b emit auxiliary light to substantially the same region, brightness of the region is simply doubled. In this case, when a light intensity of auxiliary light emitted from each of the auxiliary light emitting units 13a and 13b is reduced to half, brightness of the region is controlled such that it is substantially in a state in which, for example, only the auxiliary light emitting unit 13a emits auxiliary light.

It should be noted that regions toward which the auxiliary light emitting units 13a and 13b emit auxiliary light do not necessarily completely match. Therefore, the control system 5 determines a degree of interference between auxiliary light beams emitted from the auxiliary light emitting units 13a and 13b based on a positional relation between the auxiliary light emitting units 13a and 10b, and may control a light intensity of each auxiliary light beam according to the determination result.

In this manner, when auxiliary light beams from the plurality of auxiliary light emitting units 13 interfere with each other, the control system 5 according to the embodiment limits a light intensity of each auxiliary light beam according to a degree of interference and thus controls a target region (that is, an imaging region of each of the imaging units 15) to have more suitable brightness. In such a configuration, the control system 5 according to the embodiment can implement a more suitable imaging environment without emitting auxiliary light in a time-division manner.

In addition, in the control system 5 according to the embodiment, since it is not necessary to emit auxiliary light beams in a time-division manner, there is no influence from a limitation of multiplicity according to a time-division manner, and it is possible to link more auxiliary light emitting units 13 than in the control system 1 according to the above-described first embodiment. In addition, when the control system 5 according to the embodiment limits a light intensity of auxiliary light emitted from each of the auxiliary light emitting units 13, it is possible to implement a more suitable imaging environment and restrict power consumption to a lower amount.

The overview of the control system 5 according to the embodiment has been described above with reference to FIG. 11. Hereinafter, the control system 5 according to the embodiment will be described in further detail.

[2.2. Functional Configuration]

Figure 12:
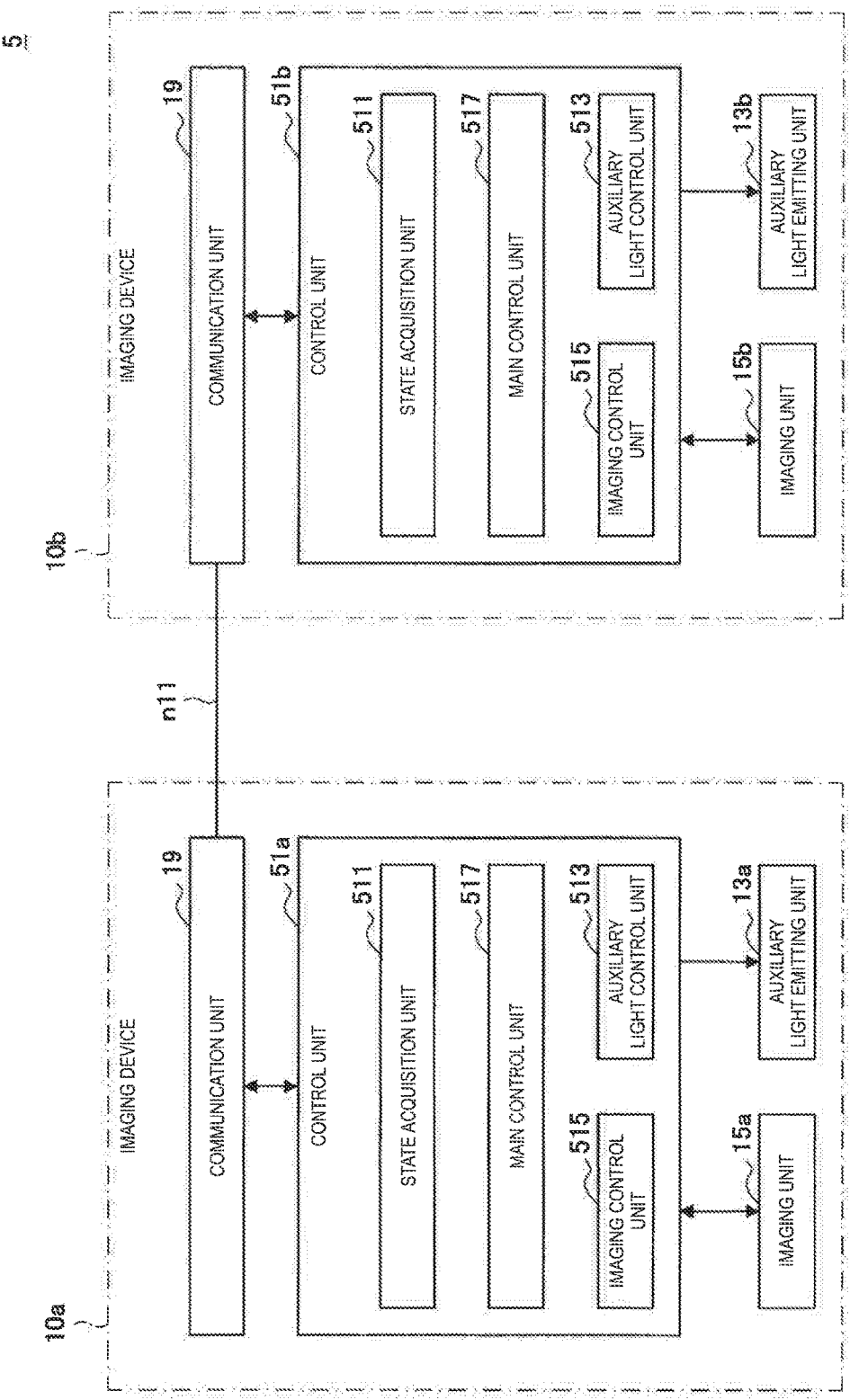
FIG. 12 is a block diagram showing an example of a functional configuration of the control system according to the embodiment.

An example of a functional configuration of the control system 5 according to the embodiment will be described with reference to FIG. 12. FIG. 12 is a block diagram showing an example of a functional configuration of the control system 5 according to the embodiment.

Note that, as shown in FIG. 12, the functional configuration of the control system 5 according to the embodiment is similar to that of the control system 1 according to the above-described first embodiment (refer to FIG. 4). For this reason, in this description, a functional configuration of the control system 5 according to the embodiment will be described with a focus particularly on parts different from those of the control system 1 according to the above-described first embodiment.

As shown in FIG. 12, the imaging device 10a according to the embodiment includes a control unit 51a, the auxiliary light emitting unit 13a, the imaging unit 15a, and the communication unit 19. Also, since the auxiliary light emitting unit 13a, the imaging unit 15a, and the communication unit 19 shown in FIG. 12 are similar to the auxiliary light emitting unit 13a, the imaging unit 15a, and the communication unit 19 in the imaging device 10a according to the first embodiment shown in FIG. 4, detailed descriptions thereof will be omitted.

The control unit 51a is a component for controlling operations of the auxiliary light emitting unit 13a and the imaging unit 15a, and corresponds to the control unit 11a in the imaging device 10a according to the first embodiment shown in FIG. 4. Also, the control unit 51a will be separately described below in detail.

Similarly, the imaging device 10b according to the embodiment includes a control unit 51b, the auxiliary light emitting unit 13b, the imaging unit 15b, and the communication unit 19. Also, since the auxiliary light emitting unit 13b, the imaging unit 15b, and the communication unit 19 shown in FIG. 12 are similar to the auxiliary light emitting unit 13b, the imaging unit 15b, and the communication unit 19 in the imaging device 10b according to the first embodiment shown in FIG. 4, detailed descriptions thereof will be omitted.

The control unit 51b is a component for controlling operations of the auxiliary light emitting unit 13b and the imaging unit 15b and corresponds to the control unit 11b in the imaging device 10b according to the first embodiment shown in FIG. 4. Note that the control unit 51b will be separately described below in detail. In addition, when the control units 51a and 31b are not particularly distinguished, they will he simply referred to as a "control unit 51" below in some cases.

Also, in the control system 5 according to the embodiment, among the plurality of imaging devices 10 (for example, the imaging devices 10a and 10b), any of the imaging devices 10 is operated as a master and the other imaging device 10 other than the master is operated as a slave. Therefore, between the imaging devices 10a and 10b shown in FIG. 12, the imaging device 10a will be operated as a master and the imaging device 10b will be operated as a slave below, and details of configurations of the imaging devices 10 will be described with a focus particularly on a configuration of the control unit 51.

(Master)

First, details of a configuration of the imaging device 10a operated as a master will he described with a focus particularly on a configuration of the control unit 51a. As shown in FIG. 12, the control unit 51a according to the embodiment includes a state acquisition unit 511, an auxiliary light control unit 513, an imaging control unit 515, and a main control unit 517.

The state acquisition unit 511 of the imaging device 10a acquires control parameters for the auxiliary light emitting unit 13a to emit auxiliary light from a predetermined acquisition source. Note that the control parameters include setting information of, for example, a light emission interval (for example, a frame rate) of auxiliary light that is emitted from the auxiliary light emitting unit 13a, a range within which the light emission interval is controllable, a light intensity of auxiliary light, and a frequency of light that is emitted as auxiliary light. In the control system 5 according to the embodiment, the state acquisition unit 511 acquires at least a control parameter indicating a light intensity (or a range within which a light intensity of the auxiliary light is controllable) of auxiliary light that is emitted from the auxiliary light emitting unit 13a. In addition, the state acquisition unit 511 may acquire a control parameter indicating a light emission interval (or a range within which the light emission interval is controllable) of auxiliary light that is emitted from the auxiliary light emitting unit 13a.

In addition, as long as the state acquisition unit 511 of the imaging device 10a can acquire control parameters for the auxiliary light emitting unit 13a to emit auxiliary light, an acquisition source of the control parameters is not particularly limited. This is similar to the imaging device 10a according to the above-described first embodiment.

In addition, the state acquisition unit 511 of the imaging device 10a acquires control parameters for the auxiliary light emitting unit 13b to emit auxiliary light from the imaging device 10b through the transfer path n11. In this case, the state acquisition unit 511 instructs the imaging device 10b to transmit control parameters and thus may actively acquire the control parameters from the imaging device 10b. Also, as another example, the state acquisition unit 511 may await transmission of control parameters from the imaging device 10b and thus may passively acquire the control parameters from the imaging device 10b.

Note that, in this case, the state acquisition unit 511 of the imaging device 10a confirms an operation state of the imaging device 10b serving as a link target based on communication through the transfer path n11, and only when the imaging device 10b is operated, may acquire control parameters from the imaging device 10b.

As described above, the state acquisition unit 511 of the imaging device 10a acquires light emission states of the auxiliary light emitting units 13a and 13b (for example, amounts of light emission of the auxiliary light emitting units 13a and 13b) and outputs the acquired light emission states of the auxiliary light emitting units 13a and 13b to the main control unit 517.

The main control unit 517 acquires light emission states of the auxiliary light emitting units 13a and 13b (for example, amounts of light emission of the auxiliary light emitting units 13a and 13b) from the state acquisition unit 511.

In addition, the main control unit 517 generates a synchronization signal for connecting timings at which the auxiliary light emitting units 13a and 13b emit auxiliary light. In this case, when control parameters indicating light emission intervals of auxiliary light beams that are emitted from the auxiliary light emitting units 13a and 13b are acquired as light emission states of the auxiliary light emitting units 13a and 13b, the main control unit 517 may generate a synchronization signal based on the control parameters. For example, FIG. 12 shows an example of the synchronization signal that is generated by the main control unit 517.

When the synchronization signal is generated, the main control unit 517 sets light emission timings of the auxiliary light emitting units 13a and 13b such that the auxiliary light emitting units 13a and 13b emit auxiliary light in synchronization with each other.

In addition, the main control unit 517 sets light intensities of auxiliary light beams emitted from the auxiliary light emitting units 13a and 13b based on the acquired light emission states of the auxiliary light emitting units 13a and 13b (for example, amounts of light emission of the auxiliary light emitting units 13a and 13b). As a specific example, the main control unit 517 may set a light intensity of the auxiliary light such that a light intensity of auxiliary light that is emitted from each of the auxiliary light emitting units 13 is limited according to the number of auxiliary light emitting units 13 that emit auxiliary light in linkage.

In addition, in this case, when the main control unit 517 limits a light intensity of auxiliary light that is emitted from the auxiliary light emitting units 13a and 13b, it may assign a weight to a limitation amount between the auxiliary light emitting units 13a and 13b according to the acquired light emission states of the auxiliary light emitting units 13a and 13b. For example, when an amount of light emission of the auxiliary light emitting unit 13b is greater than that of the auxiliary light emitting unit 13a, the main control unit 517 may set a light intensity of auxiliary light that is emitted from each of the auxiliary light emitting units 13a and 13b such that a light intensity of auxiliary light emitted from the auxiliary light emitting unit 13b is limited more.

In addition, the main control unit 517 determines a degree of interference between auxiliary light beams emitted from the auxiliary light emitting units 13a and 10b based on a positional relation between the auxiliary light emitting units 13a and 10b, and may control a light intensity of each auxiliary light beam according to the determination result. In this case, the main control unit 517 may determine a degree of interference between auxiliary light beams emitted from the auxiliary light emitting units 13a and 10b according to information indicating installation positions and orientations of the auxiliary light emitting units 13a and 10b (hereinafter referred to as "position information" in some cases) and information indicating a radiation angle.

Also, as long as the main control unit 517 can acquire position information of each of the auxiliary light emitting units 13 and information indicating a radiation angle of the auxiliary light emitting unit 13, an acquisition source of each piece of the information is not particularly limited. As a specific example, position information of each of the auxiliary light emitting units 13 and information indicating a radiation angle of the auxiliary light emitting unit 13 may be stored in advance in a storage region which is readable by the main control unit 517. In addition, as another example, the main control unit 517 may acquire position information of each of the auxiliary light emitting units 13 and information indicating a radiation angle of the auxiliary light emitting unit 13 as a user input. In addition, as still another example, the main control unit 517 may acquire position information of each of the auxiliary light emitting units 13 and information indicating a radiation angle of the auxiliary light emitting unit 13 from the imaging device 10 that controls operations of the auxiliary light emitting unit 13.

In addition, the main control unit 517 of the imaging device 10a may also set timings at which the imaging units 15a and 15b capture an image. In this case, the main control unit 517 sets an imaging timing of the imaging unit 15a such that the imaging unit 15a captures an image in synchronization with a light emission timing of the auxiliary light emitting unit 13a. Similarly, the main control unit 517 sets an imaging timing of the imaging unit 15b such that the imaging unit 15b captures an image in synchronization with a light emission timing of the auxiliary light emitting unit 13b.

Then, based on the set light intensity of auxiliary light emitted from the auxiliary light emitting unit 13a, the main control unit 517 of the imaging device 10a causes the auxiliary light control unit 513 to limit a light intensity of the auxiliary light. In addition, the main control unit 517 supplies a control signal (for example, a control pulse) to the auxiliary light control unit 513 according to the set light emission timing of the auxiliary light emitting unit 13a. The auxiliary light control unit 513 limits a light intensity of auxiliary light emitted from the auxiliary light emitting unit 13a based on an instruction from the main control unit 517, and controls an operation of the auxiliary light emitting unit 13a emitting auxiliary light based on the control signal supplied from the main control unit 517.

Note that as long as the auxiliary light control unit 513 can limit a light intensity of auxiliary light that is emitted from the auxiliary light emitting unit 13a, a method thereof is not particularly limited. As a specific example, the auxiliary light control unit 513 may reduce a light emission time of the auxiliary light emitting unit 13a, and thus may limit a light intensity of auxiliary light that is emitted from the auxiliary light emitting unit 13a. In addition, as another example, the auxiliary light control unit 513 may limit an amount of light emission (for example, a current value of a current that is supplied to a light source) of the auxiliary light emitting unit 13a, and thus may limit a light intensity of auxiliary light that is emitted from the auxiliary light emitting unit 13a.

In addition, the main control unit 517 of the imaging device 10a supplies a control signal (for example, a control pulse) to the imaging control unit 515 according to the set imaging timing of the imaging unit 15a. The imaging control unit 515 controls an operation of the imaging unit 15a capturing an image based on the control signal supplied from the main control unit 517.

As described above, based on control from the main control unit 517, a light intensity of auxiliary light emitted from the auxiliary light emitting unit 13a is limited according to a light intensity of auxiliary light emitted from another auxiliary light emitting unit 13b. In addition, when operations of the auxiliary light emitting unit 13a and the imaging unit 15a are controlled based on the control signal from the main control unit 517, a light emission timing of the auxiliary light emitting unit 13a and an imaging timing of the imaging unit 15a are synchronized.

In addition, based on the set light intensity of auxiliary light emitted from the auxiliary light emitting unit 13b, the main control unit 517 of the imaging device 10a instructs the imaging device 10b to limit a light intensity of auxiliary light emitted from the auxiliary light emitting unit 13b, When the instruction is received, the imaging device 10b limits a light intensity of auxiliary light emitted from the auxiliary light emitting unit 13b.

In addition, the main control unit 517 notifies the imaging device 10b of control information indicating the set light emission timing of the auxiliary light emitting unit 13b and the set imaging timing of the imaging unit 15b through the transfer path n11. Accordingly, the imaging device 10b can control a light emission timing of the auxiliary light emitting unit 13b and an imaging timing of the imaging unit 15b based on the control information.

The details of the configuration of the imaging device 10a operated as a master have been described with a focus particularly on the configuration of the control unit 51a.

(Slave)

Next, details of a configuration of the imaging device 10b operated as a slave will be described with a focus particularly on a configuration of the control unit 51b. As shown in FIG. 4, the control unit 51b according to the embodiment includes the state acquisition unit 511, the auxiliary light control unit 513, the imaging control unit 515, and the main control unit 517.

The state acquisition unit 511 of the imaging device 10b acquires control parameters for the auxiliary light emitting unit 13b to emit auxiliary light from a predetermined acquisition source. In addition, since details of control parameters and an acquisition source of the control parameters are similar to those of the imaging device 10a described above, details thereof will not be described. In addition, in the control system 5 according to the embodiment, the state acquisition unit 311 acquires at least a control parameter indicating a light intensity (or a range within which the light emission interval is controllable) of auxiliary light that is emitted from the auxiliary light emitting unit 13b. Also, the state acquisition unit 511 may acquire a control parameter indicating a light emission interval (or a range within which the light emission interval is controllable) of auxiliary light that is emitted from the auxiliary light emitting unit 13b.

The state acquisition unit 511 of the imaging device 10b transmits the acquired control parameters to the imaging device 10a through the transfer path n11. Note that, since a form of the state acquisition unit 511 according to the embodiment transmitting the control parameters to the imaging device 10a through the transfer path n11 is similar to that of the state acquisition unit 111 according to the above-described first embodiment (refer to FIG. 4), detailed description thereof will be omitted.

The main control unit 517 of the imaging device 10b receives an instruction for limiting a light intensity of auxiliary light emitted from the auxiliary light emitting unit 13b in response to transmission of control parameters from the state acquisition unit 511 to the imaging device 10a. Also, in addition to the instruction, the main control unit 517 acquires control information indicating a light emission timing of the auxiliary light emitting unit 13b and an imaging timing of the imaging unit 15b from the imaging device 10b.

The main control unit 517 of the imaging device 10b causes the auxiliary light control unit 513 to limit a light intensity of auxiliary light emitted from the auxiliary light emitting unit 13b based on the instruction from the imaging device 10. Note that a method of limiting a light intensity of auxiliary light is similar to that of a case in which a light intensity of auxiliary light emitted from the above-described auxiliary light emitting unit 13a is limited.

In addition, the main control unit 517 of the imaging device 10b recognizes a light emission timing of the auxiliary light emitting unit 13b based on the acquired control information and supplies a control signal (for example, a control pulse) to the auxiliary light control unit 513 according to the light emission timing. The auxiliary light control unit 513 controls an operation of the auxiliary light emitting unit 13b emitting auxiliary light based on the control signal supplied from the main control unit 517.

In addition, the main control unit 517 of the imaging device 10b recognizes an imaging timing of the imaging unit 15b based on the acquired control information and supplies a control signal (for example, a control pulse) to the imaging control unit 515 according to the imaging timing. The imaging control unit 515 controls an operation of the imaging unit 15b capturing an image based on the control signal supplied from the main control unit 517.

As described above, when operations of the auxiliary light emitting unit 13b and the imaging unit 15b are controlled based on the control signal from the main control unit 517, a light emission timing of the auxiliary light emitting unit 13b and an imaging timing of the imaging unit 15b are synchronized. In addition, in this case, a light intensity of auxiliary light emitted from the auxiliary light emitting unit 13b is limited according to a light intensity of auxiliary light emitted from the auxiliary light emitting unit 13a.

As described above, when auxiliary light beams from the plurality of auxiliary light emitting units 13 interfere with each other, the control system 5 according to the embodiment limits a light intensity of each auxiliary light beam according to a degree of interference and thus controls a target region (that is, an imaging region of each of the imaging units 15) to have more suitable brightness. In such a configuration, the control system 5 according to the embodiment can implement a more suitable imaging environment without emitting auxiliary light in a time-division manner.

In addition, in the control system 5 according to the embodiment, since it is not necessary to emit auxiliary light beams in a time-division manner, there is no influence from a limitation of multiplicity according to a time-division manner and it is possible to link more auxiliary light emitting units 13 than in the control system 1 according to the above-described first embodiment. In addition, when the control system 5 according to the embodiment limits a light intensity of auxiliary light emitted from each of the auxiliary light emitting units 13, it is possible to implement a more suitable imaging environment and restrict power consumption to a lower amount.

Also, each of the imaging devices 10 may control imaging conditions (in particular, exposure conditions and ISO sensitivity) for the imaging unit 15 to capture an image that is controlled by the imaging device 10 itself in addition to controlling a light intensity of auxiliary light emitted from the auxiliary light emitting unit 13 that is controlled by the imaging device 10 itself.

For example, when a light intensity of auxiliary light emitted from the auxiliary light emitting unit 13 is set, each of the imaging devices 10 may also set exposure conditions of the imaging unit 15, For example, the imaging device 10 may decrease a shutter speed of the imaging unit 15, and thus may further limit a light intensity of auxiliary light emitted from the auxiliary light emitting unit 13, Similarly, the imaging device 10 may increase a shutter speed of the imaging unit 15 and thus may reduce an amount of limitation of a light intensity of auxiliary light emitted from the auxiliary light emitting unit 13.

In addition, as another example, each of the imaging devices 10 may determine a light intensity of auxiliary light emitted from the auxiliary light emitting unit 13 (in other words, a limitation amount of a light intensity of the auxiliary light) according to exposure conditions of the imaging unit 15. In addition, as still another example, each of the imaging devices 10 may control imaging conditions for the imaging unit 15 to capture an image according to the limited light intensity of auxiliary light emitted from the auxiliary light emitting unit 13.

In addition, the system configuration of the control system 5 and the functional configuration of each of the imaging devices 10 described above are only examples, and the configurations may be appropriately changed similarly to the control system 1 according to the above-described first embodiment.

As a specific example, the control system 5 may have a configuration in which the plurality of imaging devices 10 are individually independently operated. In this case, for example, the plurality of imaging devices 10 may share light emission states of the auxiliary light emitting units 13 and control an operation (for example, an amount of light emission) of their own auxiliary light emitting units 13 according to a light emission state (for example, an amount of light emission) of the auxiliary light emitting unit 13 of a partner.

In addition, similarly to the control system 1 according to the above-described first embodiment, a method of each of the imaging devices 10 specifying another imaging device 10 serving as a link target is not particularly limited. As a specific example, the imaging devices 10 may share information, specify another imaging device 10 that emits auxiliary light toward an imaging region of its own imaging unit 15 based on information acquired from the other imaging device 10, and recognize the specified imaging device 10 as a link target.

In addition, as another example, each of the plurality of imaging devices 10 may specify another imaging device 10 serving as a link target based on a state in which auxiliary light is emitted from each of the imaging devices 10 and an image captured by its own imaging unit 15.

Specifically, any (for example, a master) of the plurality of imaging devices 10 sequentially emits auxiliary light toward the imaging devices 10 in a time-division manner, notifies the imaging devices 10 of information of the imaging device 10 that emits the auxiliary light, and causes the imaging devices 10 to capture an image in synchronization with emission of the auxiliary light.

Each of the imaging devices 10 analyzes an image captured by its own imaging unit 15, and determines whether an imaging region of its own imaging unit 15 is illuminated according to emission of auxiliary light from another imaging device 10. Then, each of the imaging devices 10 identifies the other imaging device 10 that emits auxiliary light based on information notified of when the imaging region of its own imaging unit 15 is illuminated and may identify the other imaging device 10 as a link target.

In addition, similarly to Modified Example 1 of the above-described first embodiment, the control system 5 may have a configuration in which three or more imaging devices 10 are operated. In this case, according to light emission states of the auxiliary light emitting units 13 of the three or more imaging devices 10, a light intensity of auxiliary light emitted from each of the auxiliary light emitting units 13 may be limited.

In addition, as another example, similarly to Modified Example 2 of the above-described first embodiment, a configuration in which the control device 20 is provided and the control device 20 controls operations of the auxiliary light emitting unit 13 and the imaging unit 15 of each imaging device may be used.

In addition, as still another example, similarly to Modified Example 3 of the above-described first embodiment, each of the imaging devices 10 may acquire a light emission state of another auxiliary light emitting unit 10 that emits auxiliary light toward an imaging region of the imaging unit 15 based on an image captured by the imaging unit 15 whose operation is controlled by the imaging device 10 itself. In this case, the imaging device 10 may estimate a light emission state of the other auxiliary light emitting unit 10 based on a change in brightness of the image captured by the imaging unit 15.

In addition, similarly to Modified Example 4 of the above-described first embodiment, a configuration in which each of the imaging devices 10 causes the auxiliary light emitting unit 13 whose operation is controlled by the imaging device 10 itself to emit auxiliary light of a specific light emission pattern, and thus notifies another imaging device 10 of the light emission state of the auxiliary light emitting unit 13 may he used.

The example of the functional configuration of the control system 5 according to the embodiment has been described above with reference to FIG. 12.

[2.3. Processes]

Figure 13:
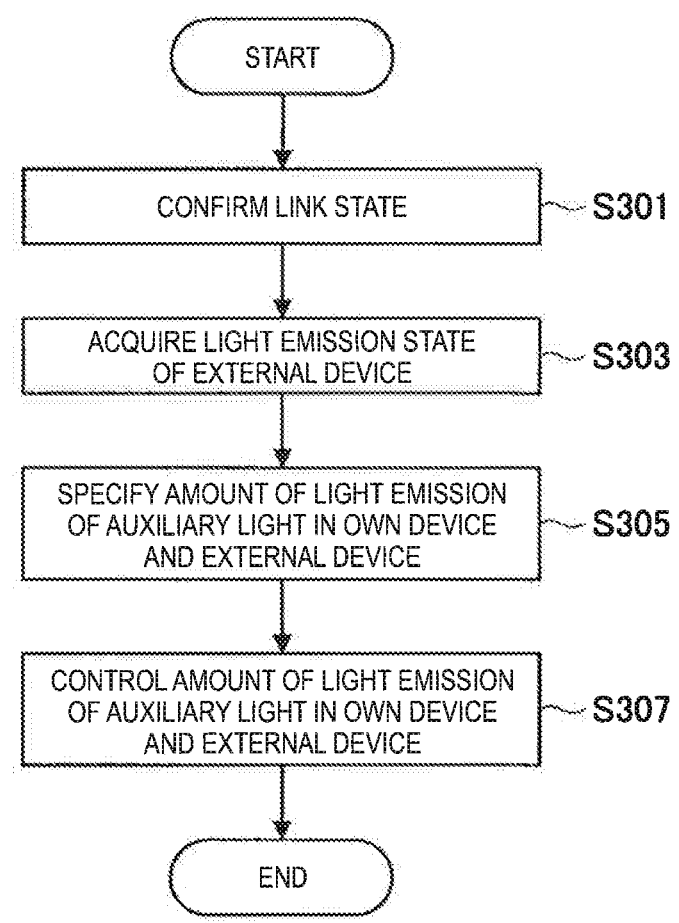
FIG. 13 is a flowchart showing an example of a flow of a series of processes of the control system according to the embodiment.

Next, an example of a flow of a series of processes of the control system 5 according to the embodiment will be described with reference to FIG. 13 and description will focus particularly on operations of the imaging device 10a operated as a master. FIG. 13 is a flowchart showing an example of a flow of a series of processes of the control system 5 according to the embodiment.

(Step S301)

First, the state acquisition unit 511 of the imaging device 10a confirms an operation state of the imaging device 10b serving as a link target based on communication through the transfer path n11.

(Step S303)

When the imaging device 10b serving as a link target is operated, the state acquisition unit 511 of the imaging device 10a acquires control parameters for the auxiliary light emitting unit 13b to emit auxiliary light from the imaging device 10b through the transfer path n11.

Also, in the control system 1 according to the embodiment, the state acquisition unit 511 acquires at least a control parameter indicating a light intensity (or a range within which a light intensity of the auxiliary light is controllable) of auxiliary light that is emitted from the auxiliary light emitting unit 13b from the imaging device 10b.

In addition, the state acquisition unit 511 of the imaging device 10a acquires control parameters for the auxiliary light emitting unit 13a to emit auxiliary light from a predetermined acquisition source.

As described above, the state acquisition unit 511 of the imaging device 10a acquires light emission states of the auxiliary light emitting units 13a and 13b (fix example, amounts of light emission of the auxiliary light emitting units 13a and 13b) and outputs the acquired light emission states of the auxiliary light emitting units 13a and 13b to the main control unit 517.

(Step S305)

The main control unit 517 acquires light emission states of the auxiliary is light emitting units 13a and 13b (for example, amounts of light emission of the auxiliary light emitting units 13a and 13b) from the state acquisition unit 511. The main control unit 517 sets light intensities of auxiliary light beams emitted from the auxiliary light emitting units 13a and 13b based on the acquired light emission states of the auxiliary tight emitting units 13a and 13b (for example, amounts of light emission of the auxiliary light emitting units 13a and 13b).

In addition, the main control unit 517 generates a synchronization signal for connecting timings at which the auxiliary light emitting units 13a and 13b emit auxiliary light. In this case, when control parameters indicating light emission intervals of auxiliary light beams that are emitted from the auxiliary light emitting units 13a and 13b are acquired as light emission states of the auxiliary light emitting units 13a and 13b, the main control unit 517 may generate a synchronization signal based on the control parameters.

When the synchronization signal is generated, the main control unit 517 sets light emission timings of the auxiliary light emitting units 13a and 13b such that the auxiliary light emitting units 13a and 13b emit auxiliary light in synchronization with each other.

(Step S307)

Then, based on the set light intensity of auxiliary light emitted from the auxiliary light emitting unit 13a, the main control unit 517 of the imaging device 10a causes the auxiliary light control unit 513 to limit a light intensity of the auxiliary light. In addition, the main control unit 517 supplies a control signal (for example, a control pulse) to the auxiliary light control unit 513 according to the set light emission timing of the auxiliary light emitting unit 13a. The auxiliary light control unit 513 limits a light intensity of auxiliary light emitted from the auxiliary light emitting unit 13a based on an instruction from the main control unit 517, and controls an operation of the auxiliary light emitting unit 13a emitting auxiliary light based on the control signal supplied from the main control unit 517.

In addition, the main control unit 517 of the imaging device 10a supplies a control signal (for example, a control pulse) to the imaging control unit 515 according to the set imaging timing of the imaging unit 15a. The imaging control unit 515 controls an operation of the imaging unit 15a capturing an image based on the control signal supplied from the main control unit 517.

In addition, based on the set light intensity of auxiliary light emitted from the auxiliary light emitting unit 13b, the main control unit 517 of the imaging device 10a instructs the imaging device 10b to limit a light intensity of auxiliary light emitted from the auxiliary light emitting unit 13b. When the instruction is received, the imaging device 10b limits a light intensity of auxiliary light emitted from the auxiliary light emitting unit 13b.

In addition, the main control unit 517 notifies the imaging device 10b of control information indicating the set light emission timing of the auxiliary light emitting unit 13b and the set imaging timing of the imaging unit 15b through the transfer path n11. Accordingly, the imaging device 10b can control a light emission timing of the auxiliary light emitting unit 13b and an imaging timing of the imaging unit 15b based on the control information.

The example of a flow of a series of processes of the control system 5 according to the embodiment has been described above with reference to FIG. 13 with a focus particularly on operations of the imaging device 10a operated as a master.

[2.4. Summary]

As described above, when auxiliary light beams from the plurality of auxiliary light emitting units 13 interfere with each other, the control system 5 according to the embodiment limits a light intensity of each auxiliary light beam according to a degree of interference and thus controls a target region (that is, an imaging region of each of the imaging units 15) to have more suitable brightness. In such a configuration, the control system 5 according to the embodiment can implement a more suitable imaging environment without emitting auxiliary light in a time-division manner.

In addition, in the control system 5 according to the embodiment, since it is not necessary to emit auxiliary light beams in a time-division manner, there is no influence from a limitation of multiplicity according to a time-division manner, and it is possible to link more auxiliary light emitting units 13 than in the control system 1 according to the above-described first embodiment. In addition, when the control system 5 according to the embodiment limits a light intensity of auxiliary light emitted from each of the auxiliary light emitting units 13, it is possible to implement a more suitable imaging environment and restrict power consumption to a lower amount.

Also, the control system 5 according to the embodiment and the control system 1 according to the above-described first embodiment may be configured in combination. In this case, in the control system, the plurality of imaging devices 10 may be divided into a plurality of groups and managed. Then, the control system may perform control of a time-division manner of light emission timings of the auxiliary light emitting units 13 in the control system 1 according to the above-described first embodiment in units of groups. That is, the control system may control operations of the auxiliary light emitting units 13 for each group such that auxiliary light emitting units 13 included in a group emit auxiliary light at different timings from auxiliary light emitting units 13 included in another group (that is, auxiliary light beams are emitted in a time-division manner).

Also, in this case, the control system may perform control of a light intensity of auxiliary light that is emitted from the auxiliary light emitting unit 13 in the control system 5 according to the above-described second embodiment within each group. That is, the control system may control a light intensity of auxiliary light that is emitted from the auxiliary light emitting unit 13 according to light emission states of the auxiliary light emitting units 13 included in the group for each group.

<3. Hardware Configuration>

Figure 14:
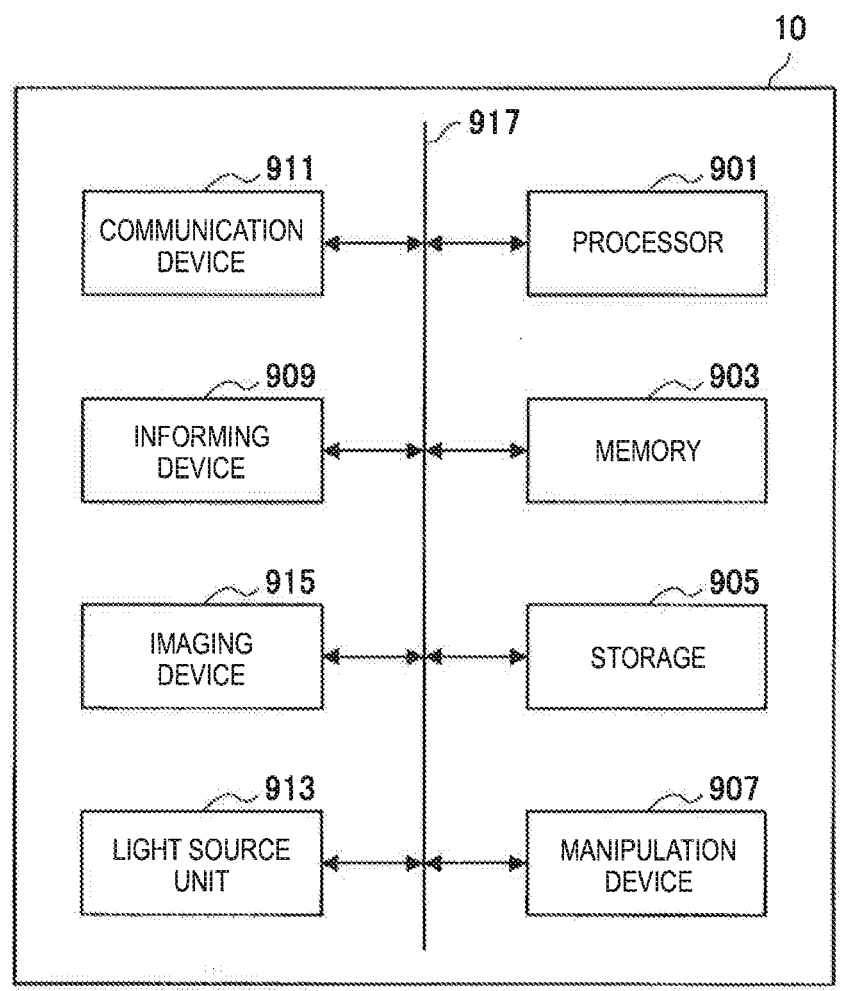
FIG. 14 is a diagram showing an example of a hardware configuration of an imaging device according to the embodiment.

Next, an example of a hardware configuration of the imaging device 10 according to the embodiment of the present disclosure will be described with reference to FIG. 14. FIG. 14 is a diagram showing an example of a hardware configuration of the imaging device 10 according to the embodiment.

As shown in FIG. 14, the imaging device 10 according to the embodiment includes a processor 901, a memory 903, a storage 905, a communication device 911, a light source unit 913, an imaging device 915, and a bus 917. In addition, the imaging device 10 may include a manipulation device 907 and an informing device 909.

The processor 901 may be, for example, a central processing unit (CPU), a graphics processing unit (GPU), a digital signal processor (DSP) or a system on chip (SoC), and performs various processes of the imaging device 10. For example, the processor 901 can be configured by an electronic circuit for performing various types of computing processing. Note that the configurations of the control unit 11 described above may be implemented by the processor 901.

The memory 903 includes a random access memory (RAM) and a read only memory (ROM), and stores programs and data that will be executed by the processor 901. The storage 905 may include a storage medium such as a semiconductor memory or a hard disk.

The manipulation device 907 has a function of generating an input signal for the user to perform a desired manipulation. The manipulation device 907 may include an input unit for the user to input information, for example, a button or a switch, and an input control circuit configured to generate an input signal based on an input by the user and supply the signal to the processor 901.

The informing device 909 is an example of an output device, and may be a device, for example, a liquid crystal display (LCD) device and an organic EL (organic light emitting diode (OLED)) display. In this case, the informing device 909 can inform the user of predetermined information by displaying a screen.

In addition, as another example, the informing device 909 may be a device configured to inform the user of predetermined information using a light or blinking pattern such as a light emitting diode (LED). Also, the informing device 909 may be a device configured to inform the user of predetermined information by outputting a predetermined acoustic signal such as a speaker.

The communication device 911 is a communication component of the imaging device 10 according to an embodiment of the present disclosure, and communicates with an external device via a network. The communication device 911 has a wired or wireless communication interface. When the communication device 911 is configured as a wireless communication interface, the communication device 911 may include a communication antenna, a radio frequency (RE) circuit, and a baseband processor.

The communication device 911 has a function of performing various types of signal processing on a signal received from the external device, and can supply a digital signal generated from a received analog signal to the processor 901. Note that the above-described communication unit 19 may be implemented by the communication device 911.

The light source unit 913 is a unit configured to emit auxiliary light and has a configuration capable of emitting light (for example, infrared light) having a wavelength that is determined in advance. The light source unit 913 includes, for example, a light emitting diode (LED), It should be noted that the light source unit 913 is not necessarily limited to an LED as long as it can emit light having a wavelength that is determined in advance. Also, the above-described auxiliary light emitting unit 13 may be implemented by the light source unit 913.

The imaging device 915 includes an imaging element such as a complementary metal-oxide semiconductor (CMOS) image sensor and a charge coupled device (CCD) image sensor that captures a subject and obtains digital data of the captured image. That is, the imaging device 915 has a function of capturing a still image or a moving image through a lens under control of the processor 901. The imaging device 915 may store the captured image in the memory 903 or the storage 905. Also, the above-described imaging unit 15 may be implemented by the imaging device 915.

The bus 917 connects the processor 901, the memory 903, the storage 905, the manipulation device 907, the informing device 909, the communication device 911, the light source unit 913, and the imaging device 915 to one another. The bus 917 may include a plurality of types of buses.

In addition, a program allowing hardware such as a processor, a memory, and a storage built into a computer to execute the same functions as the components of the above-described imaging device 10 can be created. In addition, a computer readable storage medium in which the program is recorded may be provided.

<4. Summary>

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A control device including:

an acquisition unit configured to acquire a light emission state of a first light source; and a control unit configured to control an operation of light emission of a second light source that is different from the first light source according to the acquired light emission state of the first light source.

(2)

The control device according to (1), wherein the control unit controls a light emission timing of the second light source according to the light emission state of the first fight source.

(3)
The control device according to (2),
wherein the control unit controls the light emission timing of the second light source in a manner that the first light source and the second light source emit light in a time-division manner.
(4)
The control device according to (2) or (3),
wherein the control unit controls an imaging timing of an image of an imaging unit that is associated in advance with the second light source based on the light emission timing of the second light source.
(5)
The control device according to (1),
wherein the control unit controls a light intensity of light that is emitted from the second light source according to the light emission state of the first light source.
(6)
The control device according to (5),
wherein the control unit controls an imaging condition of an imaging unit that is associated in advance with the second light source based on a light intensity of light that is emitted from the second light source.
(7)
The control device according to (5),
wherein the control unit controls a light intensity of light emitted from the second light source based on the light emission state of the first light source and an imaging condition of an imaging unit that is associated in advance with the second light source.
(8)
The control device according to (5),
wherein the control unit controls a light intensity of light that is emitted from the second light source and an imaging condition of an imaging unit that is associated in advance with the second light source according to the light emission state of the first light source.
(9)
The control device according to any one of (1) to (8),
wherein the acquisition unit acquires the light emission state of the first light source based on a synchronization signal indicating a light emission timing of each of the first light source and the second light source.
(10)
The control device according to any one of (1) to (8),
wherein the acquisition unit acquires a light emission state of the first light source based on control information acquired from an external device that is connected via a network and controls an operation of the first light source.
(11)
The control device according to any one of (1) to (8),
wherein the acquisition unit acquires a light emission state of the first light source based on a detection result of light that is emitted from the first light source.
(12)
The control device according to any one of (1) to (8), including an analysis unit configured to analyze an image captured by an imaging unit configured to image at least a part of a region that is illuminated by the second light source,
wherein the acquisition unit acquires a light emission state of the first light source based on an analysis result of the image captured by the imaging unit.
(13)
The control device according to any one of (1) to (12),
wherein the acquisition unit acquires the light emission state of the second light source and notifies an external device configured to control an operation of the first light source, of the acquired light emission state of the second light source.
(14)
The control device according to (13),
wherein the acquisition unit notifies a plurality of the external devices of the acquired light emission state of the second light source.
(15)
The control device according to any one of (1) to (14),
wherein the acquisition unit acquires the light emission states of a plurality of the second light sources.
(16)
The control device according to any one of (1) to (15), including the second light source.
(17)
The control device according to any one of (1) to (16), including an imaging unit that is associated in advance with the second light source.
(18)
A control method performed by a processor, the control method including:
acquiring a light emission state of a first light source; and
controlling an operation of light emission of a second light source that is different from the first light source according to the acquired light emission state of the first light source.
(19)
A program causing a computer to execute:
acquiring a light emission state of a first light source; and
controlling an operation of light emission of a second light source that is different from the first light source according to the acquired light emission state of the first light source.

REFERENCE SIGNS LIST 1 to 5 control system
10 imaging device
11 control unit
111 state acquisition unit
113 auxiliary light control unit
115 imaging control unit
117 main control unit
311 state acquisition unit
313 auxiliary light control unit
315 imaging control unit
317 main control unit
319 analysis unit
411 state acquisition unit
413 auxiliary light control unit
415 imaging control unit
417 main control unit
419 analysis unit
13 auxiliary light emitting unit
15 imaging unit
17 light detecting unit
19 communication unit
20 control device
21 control unit
211 state acquisition unit
217 main control unit
29 communication unit
30 imaging device
33 auxiliary light control unit
35 imaging control unit
51 control unit 511 state acquisition unit
513 auxiliary light control unit
515 imaging control unit
517 main control unit

The invention claimed is:

1. A control device comprising:
    an acquisition unit configured to acquire a light emission state of a first light source; and
    a control unit configured to generate a synchronization signal based on the acquired light emission state of the first light source, and control an operation of light emission of a second light source that is different from the first light source according to the generated synchronization signal,
    wherein the acquisition unit and the control unit are each implemented via at least one processor.

2. The control device according to claim 1,
    wherein the control unit controls a light emission timing of the second light source according to the light emission state of the first light source.

3. The control device according to claim 2,
    wherein the control unit controls the light emission timing of the second light source in a manner that the first light source and the second light source emit light in a time-division manner.

4. The control device according to claim 2,
    wherein the control unit controls an imaging timing of an image of an imaging unit that is associated in advance with the second light source based on the light emission timing of the second light source.

5. The control device according to claim 1,
    wherein the light emission state of the first light source indicates a light intensity of the first light source, and
    wherein the control unit controls a light intensity of light that is emitted from the second light source according to the light intensity of the first light source.

6. The control device according to claim 5,
    wherein the control unit controls an imaging condition of an imaging unit that is associated in advance with the second light source based on a light intensity of light that is emitted from the second light source.

7. The control device according to claim 5,
    wherein the control unit controls a light intensity of light emitted from the second light source based on the light emission state of the first light source and an imaging condition of an imaging unit that is associated in advance with the second light source.

8. The control device according to claim 5,
    wherein the control unit controls a light intensity of light that is emitted from the second light source and an imaging condition of an imaging unit that is associated in advance with the second light source according to the light emission state of the first light source.

9. The control device according to claim 1,
    wherein the acquisition unit acquires the light emission state of the first light source based on a synchronization signal supplied from an external device indicating a light emission timing of each of the first light source and the second light source.

10. The control device according to claim 1,
    wherein the acquisition unit acquires the light emission state of the first light source based on control information acquired from an external device that is connected via a network and controls an operation of the first light source.

11. The control device according to claim 1,
    wherein the acquisition unit acquires a light emission state of the first light source based on a detection result of light that is emitted from the first light source.

12. The control device according to claim 1, further comprising:
    an imaging unit configured to image at least a part of a region that is illuminated by the second light source to capture an image; and
    an analysis unit configured to analyze the image captured by the imaging unit,
    wherein the acquisition unit acquires a light emission state of the first light source based on an analysis result of the image captured by the imaging unit, and
    wherein the imaging unit and the analysis unit are each implemented via at least one processor.

13. The control device according to claim 1,
    wherein the acquisition unit acquires the light emission state of the second light source and notifies an external device configured to control an operation of the first light source, of the acquired light emission state of the second light source.

14. The control device according to claim 13,
    wherein the acquisition unit notifies a plurality of external devices of the acquired light emission state of the second light source.

15. The control device according to claim 1,
    wherein the acquisition unit acquires light emission states of a plurality of second light sources.

16. The control device according to claim 1, further comprising:
    the second light source.

17. The control device according to claim 1, further comprising:
    an imaging unit that is associated in advance with the second light source.

18. A control method performed by a processor, the control method comprising:
    acquiring a light emission state of a first light source;
    generating a synchronization signal based on the acquired light emission state of the first light source; and
    controlling an operation of light emission of a second light source that is different from the first light source according to the generated synchronization signal.

19. A non-transitory computer-readable having embodied thereon a program, which when executed by a computer caused the computer to execute a method, the method comprising:
    acquiring a light emission state of a first light source;
    generating a synchronization signal based on the acquired light emission state of the first light source; and
    controlling an operation of light emission of a second light source that is different from the first light source according to the generated synchronization signal.

20. The control device according to claim 1,
    wherein the acquisition unit is further configured to acquire a light emission state of the second light source,
    wherein light emission state of the first light source indicates a first light emission interval of light emitted from the first light source and the light emission state of the second light source indicates a second light emission interval of light emitted from the second light source, and wherein, when the first light emission interval and the second light emission interval are different, the control unit is further configured to control an operation of light emission of the first light source to change the first light emission interval according to the generated synchronization signal.

* * * * *